(12) United States Patent
Choi et al.

(10) Patent No.: US 10,904,798 B2
(45) Date of Patent: Jan. 26, 2021

(54) UE AND DEVICES FOR CODEC RATE ADAPTATION

(71) Applicant: Apple Inc., Cupertino, CA (US)

(72) Inventors: Hyung-Nam Choi, Hamburg (DE); Ozgur Oyman, San Jose, CA (US); Jerome Parron, Fuerth (DE); Marta Martinez Tarradell, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/339,300

(22) PCT Filed: Nov. 3, 2017

(86) PCT No.: PCT/US2017/059952
§ 371 (c)(1),
(2) Date: Apr. 3, 2019

(87) PCT Pub. No.: WO2018/085668
PCT Pub. Date: May 11, 2018

(65) Prior Publication Data
US 2020/0045587 A1 Feb. 6, 2020

Related U.S. Application Data

(60) Provisional application No. 62/418,138, filed on Nov. 4, 2016.

(51) Int. Cl.
*H04W 28/22* (2009.01)
*H04W 76/27* (2018.01)
(Continued)

(52) U.S. Cl.
CPC ........... *H04W 28/22* (2013.01); *H04L 65/102* (2013.01); *H04L 65/1006* (2013.01);
(Continued)

(58) Field of Classification Search
CPC ..... H04W 28/22; H04W 76/27; H04W 28/20; H04W 72/085; H04W 88/181; H04L 25/1006; H04L 65/102; H04L 65/108
See application file for complete search history.

(56) References Cited

U.S. PATENT DOCUMENTS

2011/0153816 A1* 6/2011 Lloyd .................. H04L 47/822
709/224
2014/0099966 A1* 4/2014 Hori ...................... H04W 76/22
455/450

FOREIGN PATENT DOCUMENTS

WO WO-2016144246 A1 9/2016

OTHER PUBLICATIONS

"International Application Serial No. PCT/US2017/059952, International Search Report dated Feb. 7, 2018", 4 pgs.
(Continued)

*Primary Examiner* — Duc C Ho
(74) *Attorney, Agent, or Firm* — Kowert, Hood, Munyon, Rankin & Goetzel, P.C.

(57) ABSTRACT

Devices, methods, user equipment (UE), network core devices, gateway devices, evolved node B (eNB), and storage media for UE provisioning are described. In one embodiment, a UE is configured for codec bitrate adaptation via an interface configured to receive a bandwidth indication and a codec awareness indication from an eNB. The UE process the bandwidth indication and identifies, based on the codec awareness indication, a first codec from a plurality of codecs supported by the UE. The UE then configures with the eNB using data encoded with the first codec. This data may, for example, be Voice over Long-Term Evolution (VoLTE) data or other such media data. Selection of the codec or associated codec information may be further based on the codec awareness indication.

25 Claims, 12 Drawing Sheets

(51) Int. Cl.
*H04L 29/06* (2006.01)
*H04W 28/20* (2009.01)
*H04W 72/08* (2009.01)
*H04W 88/18* (2009.01)

(52) U.S. Cl.
CPC ........... *H04L 65/608* (2013.01); *H04W 28/20* (2013.01); *H04W 72/085* (2013.01); *H04W 76/27* (2018.02); *H04W 88/181* (2013.01)

(56) References Cited

OTHER PUBLICATIONS

"International Application Serial No. PCT/US2017/059952, Written Opinion dated Feb. 7, 2018", 11 pgs.
"RAN-based codec mode/rate adaptation mechanism for VoLTE", R2-164993, 3GPP TSG-RAN WG2 Meeting #95, (Aug. 13, 2016).
Huawei, Hisilicon, "Further discussion on RAN based codec adaption solution", R2-165510, 3GPP TSG-RAN WG2 Meeting #95, (Aug. 13, 2016).
Huawei, Hisilicon, "UE assistance information for codec adaptation", R2-166757, 3GPP TSG-RAN WG2 Meeting #95bis, (Oct. 1, 2016).
Kyocera, "Remaining issues in RAN-assisted codec rate adaptation", R2-164985, 3GPP TSG-RAN WG2 #95, (Aug. 12, 2016).

\* cited by examiner

UE AND DEVICES FOR CODEC RATE ADAPTATION

PRIORITY CLAIM

This application is a U.S. National Stage Filing under 35 U.S.C. 371 from International Application No. PCT/US2017/059952, filed Nov. 3, 2017 and published in English as WO 2018/085668 on May 11, 2018, which claims the benefit of priority to U.S. Provisional Patent Application Ser. No. 62/418,138, filed Nov. 4, 2016, and titled "CODEC RATE ADAPTATION MECHANISMS FOR VOICE AND VIDEO," each of which is incorporated herein by reference in its entirety.

TECHNICAL FIELD

Embodiments pertain to systems, methods, and component devices for wireless communications, and particularly to Internet Protocol (IP) Multimedia Subsystem (IMS) multimedia telephony (MMTel) and Voice over IMS over LTE (VoLTE).

BACKGROUND

LTE and LTE-Advanced are standards for wireless communication of high-speed data for user equipment (UE) such as mobile telephones. Provisioning of wireless devices refers to providing a device with the credentials needed to transfer data over a particular network.

LTE systems can be used to communicate both data and voice. LTE Advanced systems can communicate digital voice communications. This can be performed using different standards, including Internet Protocol (IP) Multimedia Subsystem (IMS) multimedia telephony (MMTel) and Voice over IMS over LTE (VoLTE). VoLTE can provide voice communications using a packet switched network, which can provide many benefits over voice communications using a traditional circuit switched network.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
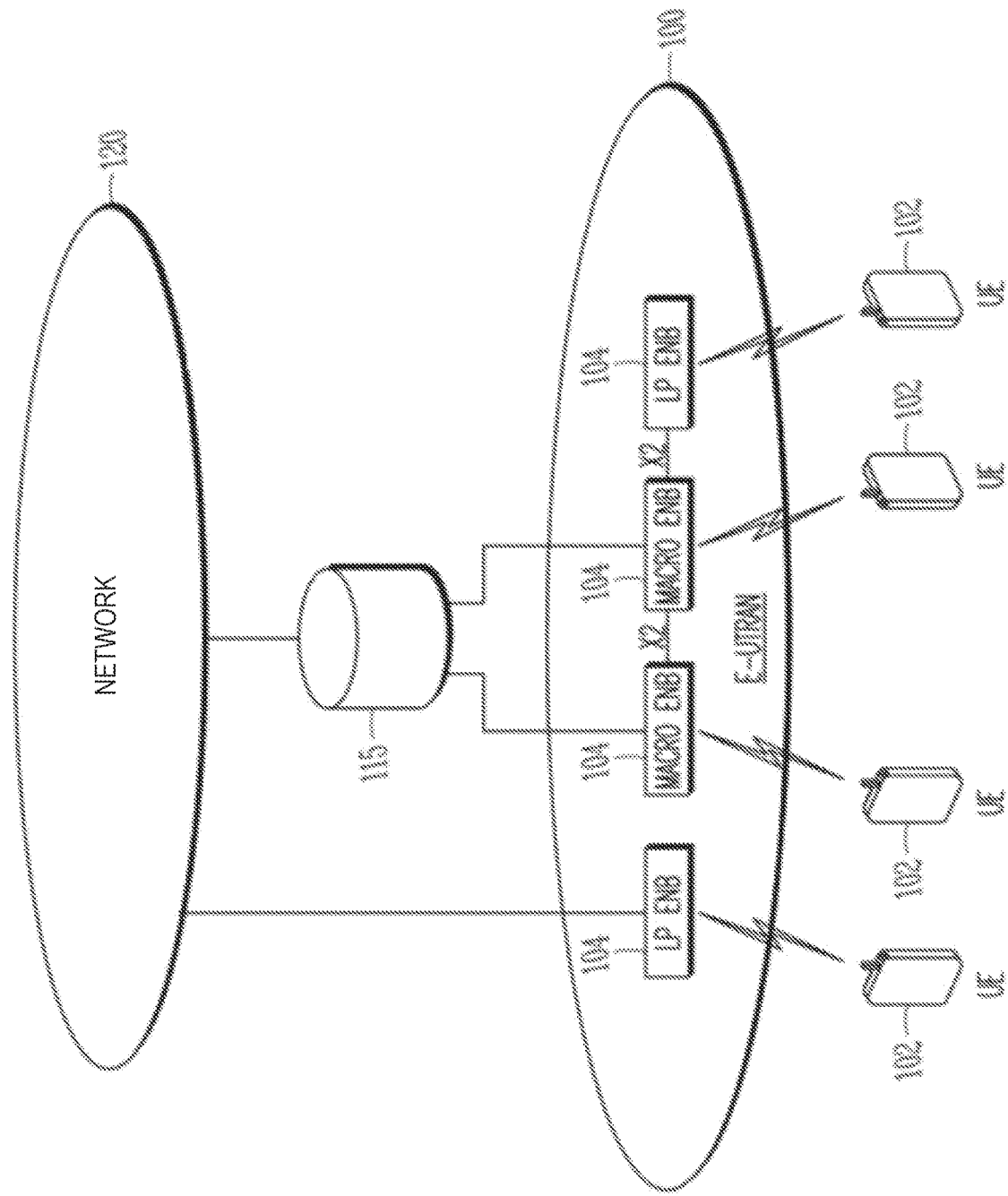
FIG. 1 is a diagram of a wireless network, in accordance with some embodiments.

FIG. 1 shows an example of a portion of an end-to-end network architecture of a network (e.g., an LTE network, a third-generation partnership project (3GPP) standardized network, or a compatible NextGen system) with various components of the network, in accordance with some embodiments. Such a network architecture may be used to implement various communication system implementations, including systems that operate using frequencies dedicated exclusively to the system as well as frequencies shared with other systems. Such a network allows UEs to obtain connectivity via the network.

VoLTE is a feature in LTE to provide voice service over a packet-switched (PS) network. VoLTE stands for "Voice over IMS over LTE" and allows an operator to replace circuit-switched services over previous systems. Embodiments described herein further relate to enhancements to enable VoLTE and ViLTE ("Video over IMS over LTE") codec adaptation over LTE. In some systems, there is a very limited possibility for an eNB to control the codec type and codec bitrate used during IMS voice and video call. For example, the eNB may not provide indication to adapt the codec bitrate based on the available bandwidth at radio level. In other systems, the eNB may operate differently, such that the eNB is aware of various codecs and may assist with codec selection and adaptation. In other systems, an eNB may explicitly signal that it is not codec aware, or a UE may simple assume, based on the absence of a signal indicating that an eNB is or is not codec aware, that the eNB is not codec aware.

In legacy networks, an eNB may set an ECN (Explicit Congestion Notification) bit in the IP header to indicate to the UE a congestion situation. This may be, however, an inefficient technique due to the following reasons: it does not distinguish between UL/DL congestion; it does not work efficiently and is slow for half duplex UL only voice; it requires an eNB to perform packet inspection for setting the ECN bits; it is either on or off and does not support finer granularity in adaptation; and, in addition, an enhanced voice services (EVS) codec may not support ECN due to missing session description protocol (SDP) information.

Some embodiments herein may relate to a technique for a dynamic indication from the eNB to the UE of the available bandwidth at radio level for UL and DL. The eNB can dynamically notify the UE of: a prioritized bitrate for the logical channel in uplink that has been configured to carry the data for voice or video; or a recommended prioritized bitrate for the logical channel in downlink that has been configured to carry the data for voice or video. In such embodiments, the eNB determines dynamically the UL prioritized bitrate and DL recommended prioritized bitrate based on the radio condition or the number of users/UEs to serve. For the UL traffic, based on the UL prioritized bitrate indication, the UE can determine the appropriate codec type and codec bitrate to apply. For the DL traffic, based on the DL recommended prioritized bitrate indication, the UE can indicate to the remote peer or media gateway what should be the appropriate codec type and codec bitrate to apply due to the bandwidth limitation on the local DL radio link. The notification of the available bandwidth can be done with Radio Resource Control (RRC) signaling or using inband signaling for instance using a new MAC control element.

Various embodiments may also relate to a technique for the UE to notify the eNB of the preferred codec bitrate. Based on the selected codec type and codec bitrate at call setup or during an ongoing call, and also based on the voice or video quality and the redundancy required, the UE can dynamically request bandwidth adaptation for the voice or video bearer. The notification of the preferred codec bitrate can be done with L3 signaling or using in-band signaling, for instance using a new MAC control element. The eNB can dynamically notify the UE of the available bandwidth for the IMS voice and/or video bearer, and the UE can translate this bandwidth into a codec bitrate which is applicable for UL and DL, and can dynamically adapt the codec bitrate to the radio condition and available bandwidth (e.g., increasing or decreasing the bitrate). In some embodiments, this is applicable for half- and full-duplex operation, and may remove the need for packet inspection.

Additionally, some embodiments may include introduction of a message to notify a UE of the available bandwidth (e.g., prioritized bitrate in UL or recommended prioritized bitrate in DL) for a specific bearer to the UE. This may be done via L3 signaling by using a legacy RRC control message or new RRC control message or via inband signaling by using a new media access control (MAC) element. In some such embodiments, the available bandwidth can be applied separately for UL and DL.

Various embodiments described herein may thus be used by a network to enable codec rate adaption following a dynamic bandwidth modification. Some embodiments are particularly directed to operations where an eNB operates with awareness of codecs in use by UEs, as is described in more detail below. Other embodiments operate where an eNB is not aware of codecs. In codec-aware embodiments, the UE may signal negotiated information with an eNB and signal additional information such as packet loss rates, supported codec types, and supported codec modes upon receipt of an indication that a rate is to be adapted due to congestion.

As used herein, "LTE network" refers to both LTE and LTE Advanced (LTE-A) networks, as well as other versions of LTE networks in development, such as 4G and 5G LTE networks, which are examples of NextGen networks. The network may comprise a radio access network (RAN) (e.g., as depicted, the Evolved Universal Terrestrial Radio Access Network (EUTRAN)) 100 and a network core 120. For convenience and brevity, only a portion of the network core 120, as well as the RAN 100, is shown in the example.

The network core 120 may include various components, such as a mobility management entity (MME), a serving gateway (S-GW), and a packet data network gateway (PDN GW), in addition to other elements discussed below. In some embodiments, the network core 120 may particularly use an Internet Protocol (IP) Multimedia Subsystem (IMS) system within the network core 120 to manage codec selection for UEs communicating in an LTE system. Various network core systems may include different combinations of elements as described herein. The RAN 100 may include evolved node Bs (eNBs) 104 (which may operate as base stations) for communicating with user equipment (UEs) 102. The eNBs 104 may include macro eNBs and low-power (LP) eNBs. The eNBs 104 may employ the techniques described herein to communicate information between a network core 120 and a UE 102 as described herein.

The eNBs 104 (macro and LP) may terminate the air interface protocol and may be the first point of contact for a UE 102. In some embodiments, an eNB 104 may fulfill various logical functions for the RAN 100 including, but not limited to, radio network controller (RNC) functions such as radio bearer management, uplink and downlink dynamic radio resource management and data packet scheduling, and mobility management. In accordance with some embodiments, the UEs 102 may be configured to communicate orthogonal frequency division multiplexed (OFDM) communication signals with an eNB 104 over a multi-carrier communication channel in accordance with an orthogonal frequency-division multiple access (OFDMA) communication technique. The OFDM signals may comprise a plurality of orthogonal subcarriers.

The interface 115 may be the interface that separates the RAN 100 and the network core 120. It may be split into two parts in some embodiments: the S1-U, which may carry traffic data between the eNBs 104, and the S1-MME, which may be a signaling interface between the eNBs 104. An X2 interface may be the interface between pairs of the eNBs 104. The X2 interface may comprise two parts, the X2-C and X2-U. The X2-C may be the control-plane interface between the eNBs 104, while the X2-U may be the user-plane interface between the eNBs 104.

In cellular networks, the LP eNBs 104 in some embodiments are used to extend coverage to indoor areas where outdoor signals do not reach well, or to add network capacity in areas with dense usage. In particular, it may be desirable to enhance the coverage of a wireless communication system using cells of different sizes, such as macrocells, microcells, picocells, and femtocells, to boost system performance. The cells of different sizes may operate on the same frequency band, or may operate on different frequency bands with each cell operating on a different frequency band or only cells of different sizes operating on different frequency bands. As used herein, the term "LP eNB" refers to any suitable relatively LP eNB for implementing a smaller cell (smaller than a macrocell) such as a femtocell, a picocell, or a microcell. Femtocell eNBs are, in some embodiments, provided by a mobile network operator to its residential or enterprise customers. A femtocell, in some embodiments, is the size of a residential gateway or smaller and may generally connect to a broadband line. The femtocell may connect to the mobile operator's mobile network and provide extra coverage in a range of 30 to 50 meters. Similarly, a picocell may be a wireless communication system covering a small area, such as in-building (offices, shopping malls, train stations, etc.), or more recently, in-aircraft. A picocell eNB may generally connect through the X2 link to another eNB such as a macro eNB through its base station controller (BSC) functionality. Thus, an LP eNB 104 may be implemented with a picocell eNB since it may be coupled to a macro eNB 104 via an X2 interface. Picocell eNBs or other such devices may incorporate some or all functionality of a macro eNB 104 or LP eNB 104. In some cases, this may be referred to as an access point base station or enterprise femtocell.

Communication over an LTE network may be split up into 10 ms radio frames, each of which may contain ten 1 ms subframes. Each subframe of the frame, in turn, may contain two slots of 0.5 ms. Each subframe may be used for uplink (UL) communications from the UE 102 to the eNB 104 or downlink (DL) communications from the eNB 104 to the UE 102. In one embodiment, the eNB 104 may allocate a greater number of DL communications than UL communications in a particular frame. The eNB 104 may schedule transmissions over a variety of frequency bands. Each slot of the subframe may contain 6-7 OFDM symbols, depending on the system used. In one embodiment, each subframe may contain 12 subcarriers. In the 5G system or NextGen systems, however, the frame size (in ms), the subframe size, and the number of subframes within a frame, as well as the frame structure, may be different from those of a 4G or LTE system. The subframe size, as well as the number of subframes in a frame, may also vary in the 5G system from frame to frame. For example, while the frame size may remain at 10 ms in the 5G system for downward compatibility, the subframe size may be decreased to 0.2 ms or 0.25 ms to increase the number of subframes in each frame.

A downlink resource grid may be used for downlink transmissions from an eNB (e.g., an eNB 104) to a UE (e.g., a UE 102), while an uplink resource grid may be used for uplink transmissions from a UE to an eNB or from a UE to another UE. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. An RB in some embodiments may be 180 kHz wide in frequency and one slot long in time. In frequency, RBs may be either 12×15 kHz subcarriers or 24×7.5 kHz subcarriers wide, dependent on the system bandwidth. In Frequency Division Duplexing (FDD) systems, both the uplink and downlink frames may be 10 ms and frequency (full-duplex) or time (half-duplex) separated. The duration of the resource grid in the time domain corresponds to one subframe or two resource blocks. Each resource grid may comprise 12 (subcarriers)×14 (symbols)=168 resource elements.

Each OFDM symbol may contain a cyclic prefix (CP), which may be used to effectively eliminate Inter Symbol Interference (ISI), and a Fast Fourier Transform (FFT) period. The duration of the CP may be determined by the highest anticipated degree of delay spread. Although distortion from the preceding OFDM symbol may exist within the CP, with a CP of sufficient duration, preceding OFDM symbols do not enter the FFT period. Once the FFT period signal is received and digitized, the receiver may ignore the signal in the CP.

Figure 2:
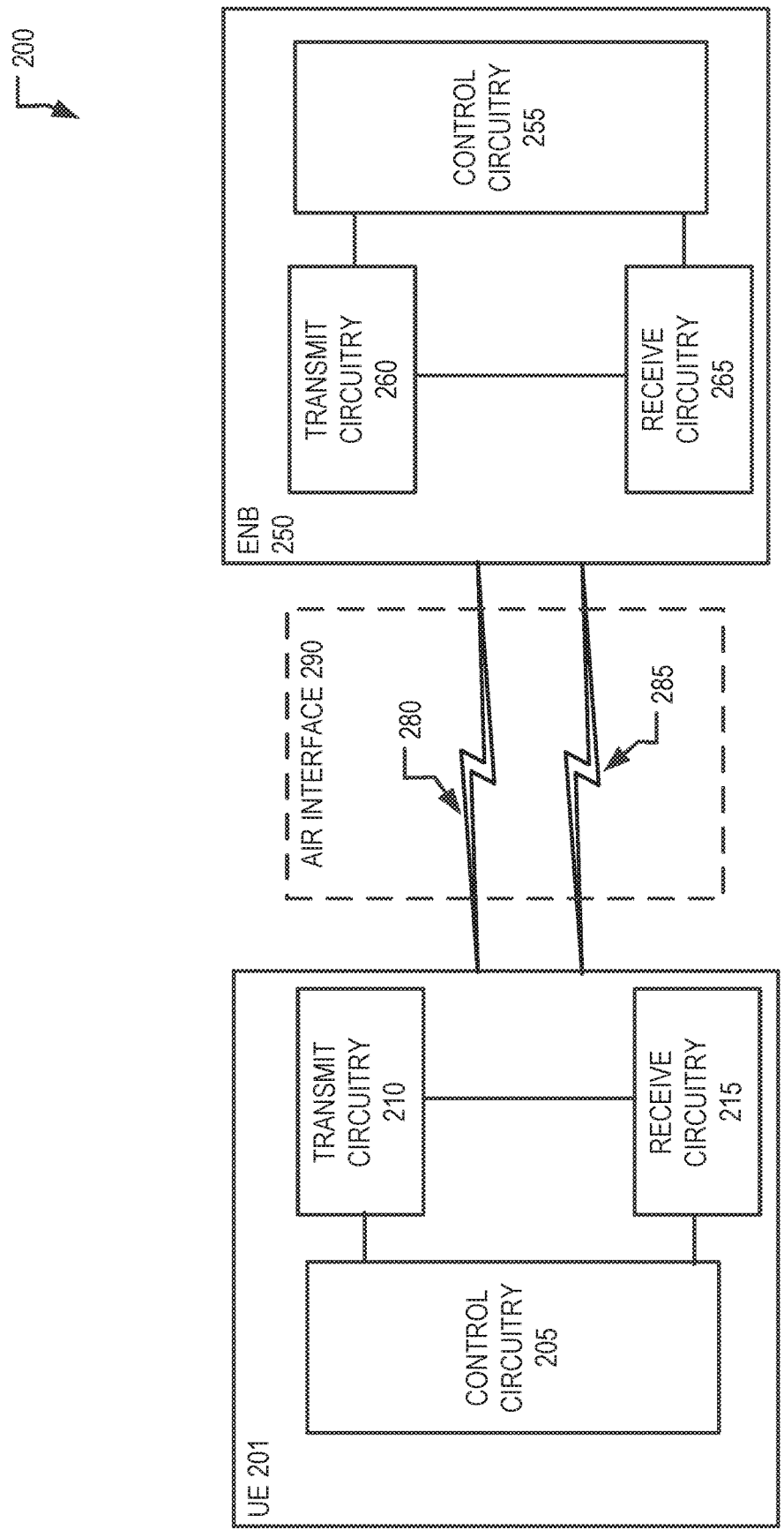
FIG. 2 illustrates components of a wireless communication network, in accordance with some embodiments.

FIG. 2 illustrates a wireless network 200, in accordance with some embodiments. The wireless network 200 includes a UE 201 and an eNB 250 connected via one or more channels 280, 285 across an air interface 290. The UE 201 and eNB 250 communicate using a system that supports controls for managing the access of the UE 201 to a network via the eNB 250.

In the wireless network 200, the UE 201 and any other UE in the system may be, for example, laptop computers, smartphones, tablet computers, printers, machine-type devices such as smart meters or specialized devices for healthcare monitoring, remote security surveillance systems, intelligent transportation systems, or any other wireless devices with or without a user interface, and in particular, any UE configured for VoLTE or MMTel communications. In network 200, the eNB 250 provides the UE 201 network connectivity to a broader network (not shown). This UE 201 connectivity is provided via the air interface 290 in an eNB service area provided by the eNB 250. In some embodiments, such a broader network may be a wide area network operated by a cellular network provider, or may be the Internet. Each eNB service area associated with the eNB 250 is supported by antennas integrated with the eNB 250. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the eNB 250, for example, includes three sectors, each covering an approximately 120-degree area, with an array of antennas directed to each sector to provide 360-degree coverage around the eNB 250.

The UE 201 includes control circuitry 205 coupled with transmit circuitry 210 and receive circuitry 215. The transmit circuitry 210 and receive circuitry 215 may each be coupled with one or more antennas. The control circuitry 205 may be adapted to perform operations associated with selection of codecs for communication and to adaption of codecs for wireless communications as part of system congestion control. The control circuitry 205 may include various combinations of application-specific circuitry and baseband circuitry. The transmit circuitry 210 and receive circuitry 215 may be adapted to transmit and receive data, respectively, and may include radio frequency (RF) circuitry or front-end module (FEM) circuitry, including communications using codecs as described herein. In various embodiments, aspects of the transmit circuitry 210, receive circuitry 215, and control circuitry 205 may be integrated in various ways to implement the circuitry described herein. The control circuitry 205 may be adapted or configured to perform various operations such as those described elsewhere in this disclosure related to a UE. The transmit circuitry 210 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 210 may be configured to receive block data from the control circuitry 205 for transmission across the air interface 290. Similarly, the receive circuitry 215 may receive a plurality of multiplexed downlink physical channels from the air interface 290 and relay the physical channels to the control circuitry 205. The plurality of downlink physical channels may be multiplexed according to TDM or FDM along with carrier aggregation. The transmit circuitry 210 and the receive circuitry 215 may transmit and receive both control data and content data (e.g., messages, images, video, etc.) structured within data blocks that are carried by the physical channels.

FIG. 2 also illustrates the eNB 250, in accordance with various embodiments. The eNB 250 circuitry may include control circuitry 255 coupled with transmit circuitry 260 and receive circuitry 265. The transmit circuitry 260 and receive circuitry 265 may each be coupled with one or more antennas that may be used to enable communications via the air interface 290.

The control circuitry 255 may be adapted to perform operations for analyzing and selecting codecs, managing congestion control and bandwidth limitation communications from an eNB, determining whether an eNB is codec aware, and communicating with a codec-aware eNB to manage codec selection for various communication operations described herein. The transmit circuitry 260 and receive circuitry 265 may be adapted to transmit and receive data, respectively, to any UE connected to the eNB 250 using data generated with various codecs described herein. The transmit circuitry 260 may transmit downlink physical channels comprised of a plurality of downlink subframes. The receive circuitry 265 may receive a plurality of uplink physical channels from various UEs, including the UE 201.

Figure 3:
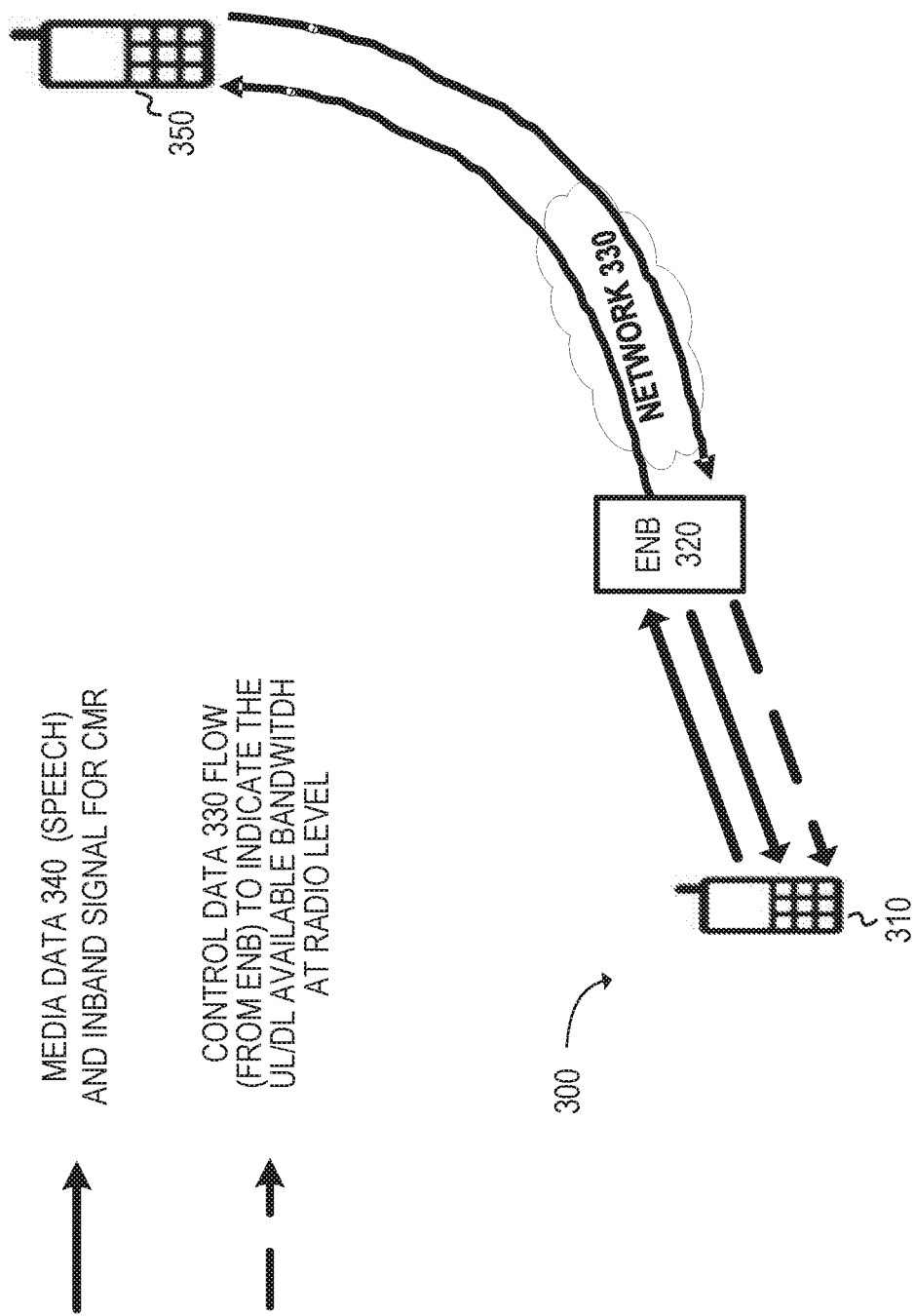
FIG. 3 depicts functionality of Radio Access Network (RAN) congestion detection with UE initiated codec rated adaptation, in accordance with some embodiments described herein.

FIG. 3 provides one illustration of the codec bitrate adaptation 300 based on eNB 320 signaling to notify UEs 310 and 350 of UL and DL available bandwidth, with UE 310 connected to eNB 320 (e.g. via an air gap), and UE 350 connected to eNB 320 via a network 335 (e.g. other eNBs or additional system architecture). FIG. 3 illustrates media data 340 (e.g., speech) flow and control data 330 (e.g. from eNB 320) flow for two UEs 310, 350, and an eNB 320.

For example, in one embodiment, RRC and MAC signaling can be used as part of control data 330 for signaling congestion detection. The RRC and MAC signaling may be used instead of explicit congestion notification (ECN) signaling. UE 310, which has a previously established connection with eNB 320 and UE 350, responds to the control data 330 indicating congestion by adjusting a UL bitrate and sending CMR/re-INVITE communications to UE 310. UE 350 then adjusts a UL bitrate based on the CMR/re-INVITE communication. CMR is an in-band signaling operation that may, for example, be conveyed using an RTCP report. CMR allows modification of a codec rate among previously negotiated coded rates. Re-INVITE is a session initiated protocol (SIP) signaling message that is triggered by a control plane operation, and allows renegotiation of a codec type or a set of supported codec rates.

Thus, in one embodiment, a first UE 310 can transmit media data 340 such as speech and an in-band signal to a second UE 350 via a codec mode request (CMR). A bitrate indication, which can be decoded at an IMS device, is received for each of an uplink and downlink radio link between a first UE 310 and a second UE 350. In some embodiments, an IMS device is a media gateway in the core network of a system operator.

In another embodiment, the eNB 320 provides a bandwidth indication to the UE 310 based on information such as radio resource usage, a radio link quality, a number of users, or other such information. Based on this information, the UE 310 can determine an appropriate codec type and codec rate to apply. If some adaptation is needed to conform with the bandwidth indication, the UE 310 may send a request to adapt a codec rate, using inband signaling with CMR or to change the codec type using SDP negotiation with an SIP re-INVITE message. When the UE 350 receives the message. UE 350 will perform a codec rate or codec type adaptation.

In some systems, a conversion table can be utilized for the UE to determine a codec bitrate based on the available bandwidth as notified by the eNB. The table can indicate which codec type, codec bitrate and redundancy scheme to apply to satisfy a determined bandwidth. Accordingly, the table below indicates the codec bitrate for an Adaptive Multi-rate (AMR) narrowband (NB) codec, an Adaptive Multi-rate (AMR) wideband (WB) codec, an Enhanced Voice Services (EVS) codec, and an example of the relationship between the codec type, the sampling rate, and the codec bitrate.

TABLE 1

| Codec name | Sampling Rate (kHz) | bitrates (Kbits/sec) |
|---|---|---|
| EVS | 8k, 16k | 5.9 |
| | 8k, 16k | 7.2 |
| | 8k, 16k | 8 |
| | 8k, 16k, 32k | 9.6 |
| | 8k, 16k, 32k | 13.2 |
| | 8k, 16k, 32k, 48k | 16.4 |
| | 8k, 16k, 32k, 48k | 24.4 |
| | 16k, 32k, 48k | 32 |
| | 16k, 32k, 48k | 48 |
| | 16k, 32k, 48k | 64 |
| | 16k, 32k, 48k | 96 |
| | 16k, 32k, 48k | 128 |
| AMR NB | 8k | 12.2 |
| | 8k | 10.2 |
| | 8k | 7.95 |
| | 8k | 7.4 |
| | 8k | 6.7 |
| | 8k | 5.9 |
| | 8k | 5.15 |
| | 8k | 4.75 |
| AMR WB | 16k | 6.6 |
| | 16k | 8.85 |
| | 16k | 12.65 |
| | 16k | 14.25 |
| | 16k | 15.85 |
| | 16k | 18.25 |
| | 16k | 19.85 |
| | 16k | 23.05 |
| | 16k | 23.85 |

In the above table, the codec type bitrate can be selected in such a way that the computation of bandwidth (b=AS) for a selected codec type and bitrate falls below or is equivalent to the updated/available bandwidth from eNB. Further, the computation of bandwidth (b=AS) can also include additional data for a protocol layer header, such as an internet protocol version 4 (IPv4)/IPv6, a User Diagram Protocol (UDP), or a Real-time Transport Protocol (RTP) that can be included in the codec bitrate. The additional data related to the protocol layers header can vary depending of the usage or not of a Robust Header Compression (RoHC).

In another example, when notifying the UL prioritized bitrate or the DL recommended prioritized bitrate to the UE, the eNB can indicate an explicit bitrate in kilobits/s, or an index to a table of possible bitrates (e.g., more compact encoding). This is illustrated in the below table, which provides an example of a conversion table between bandwidth index and bitrate value to be used for the eNB to signal available bandwidth for UL and DL.

TABLE 2

Bandwidth Index

| Value | Rate (kbps) |
|---|---|
| 0 | 5 |
| 1 | 8 |
| 2 | 10 |
| 3 | 13 |
| 4 | 15 |
| 5 | 18 |
| 6 | 20 |
| 7 | 25 |
| 8 | 35 |
| 9 | 50 |
| 10 | 70 |
| 11 | 100 |
| 12 | 130 |
| 13 | ... |

In some embodiments, a request can be made from a first UE 310 to a remote peer (e.g., UE 350), or to a media gateway, to change the bitrate according to the DL bandwidth available for the local UE. The local UE can use RTP Codec Mode Request (CMR) to notify the peer UE/media gateway to reduce or increase the peer UL codec bitrate based on the available DL bandwidth for the local UE.

In some embodiments where in-band rate adaptation using RTP CMR is not possible, the local UE can trigger a session update procedure using a Session Initiation Protocol (SIP) re-INVITE to negotiate the new preferred codec and the bitrate as described above.

In another example, there can be an introduction of a message for a UE to notify the eNB of the preferred codec bitrate for VoLTE or ViLTE. The UE can indicate dynamically the preferred codec bitrate according to the codec type, codec bitrate and redundancy scheme the UE determines to apply. The decision can be related to the observed voice/video quality level, packet loss rate or jitter level. The UE can also signal the preferred codec bitrate to the eNB using Radio Resource Control (RRC) signaling or in-band signaling (e.g., using a new MAC control element).

In the case of codec aware eNB systems, a UE can signal explicit further information related to packet loss rates and additional codec information about supported codec types and modes. The above tables can be used in either systems with eNBs that are not codec aware, or with eNBs that are codec aware in conjunction with additional information, depending on the particular implementation. Additionally, various embodiments may use other methods of accessing information other than tables similar to the tables above.

As mentioned above, in some embodiments, new signaling from eNB 320 to UE 310 is defined, in some embodiments, to indicate whether eNB 320 is codec aware or codec agnostic. In some embodiments, a one bit signal may be included in a message from eNB 320 to a UE such as UE 310 to indicate whether eNB 320 codec aware or codec agnostic. In some embodiments, a UE is configured to assume that an eNB 320 is codec agnostic if the indicator is not present. The UE, upon receiving an indication from an eNB, adaptively decides what information to signal to the eNB in such embodiments, based on the indication. In some such embodiments, if the eNB is codec agnostic (e.g., as indicated by a bit value of 0 in some embodiments), the UE signals only a bitrate range (e.g., maximum and minimum codec bitrates) and a packet loss rate. If the eNB is codec aware (e.g., indicated by a bit value of 1 in some embodiments), then the UE can signal negotiated codec information such as negotiated codec types and modes. The indication that the eNB is aware is an indication that the eNB is configured to accept and process this additional information related to UE codec types and modes. As mentioned above, for legacy eNBs, where no such signaling would be present, the UE is configured to assume that the eNB is codec agnostic, and signal only the bitrate range and packet loss rate.

Figure 4:
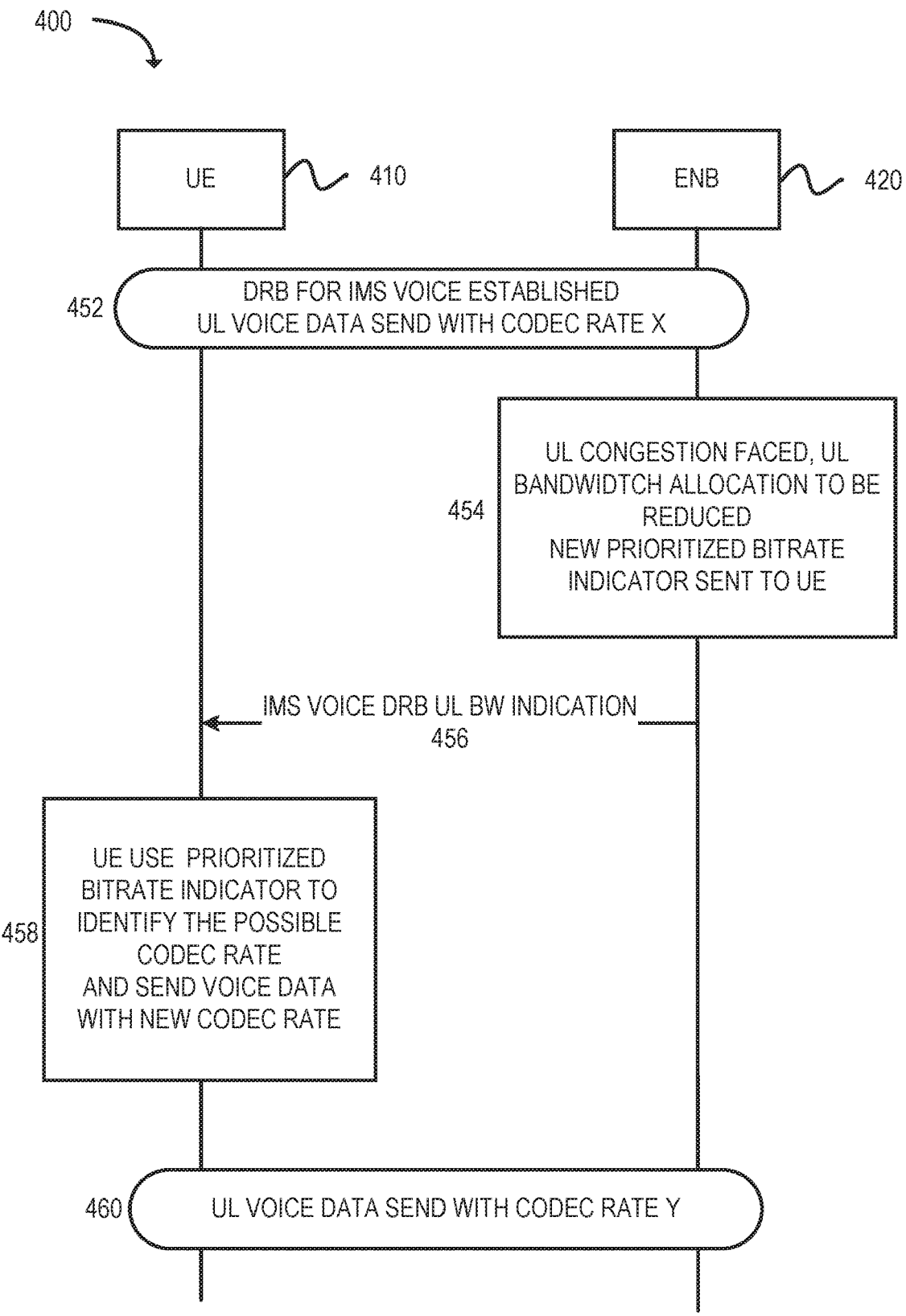
FIG. 4 illustrates user equipment (UE)-evolved Node B (eNB) interaction to adapt uplink (UL) codec bitrate for voice based on UL bandwidth available at radio level, in accordance with some embodiments described herein.

FIG. 4 illustrates user equipment (UE)-evolved Node B (eNB) interaction to adapt uplink (UL) codec bitrate for voice based on UL bandwidth available at radio level, in accordance with some embodiments described herein. FIG. 4 shows system 400 with UE 410 and eNB 420.

In the example of system 400, a data radio bearer (DRB) for VoLTE can be established to send UL voice data with a codec rate X in operation 452. Then, in operation 454, a determination is made that there is UL facing congestion, the UL bandwidth allocation can be reduced, and a new prioritized bitrate indicator can be sent to the UE 410 from the eNB 420. In operation 456, a new prioritized bitrate indicator is sent as an IMS Voice DRB UL bandwidth (BW) indication. In other embodiments, other bitrate indicators may be used. For example, in another embodiment, any UL radio bandwidth indication may be communicated, or any other such communication based on the particular congestion and system configuration. Additionally, in some embodiments if the eNB is codec aware, the eNB provides a codec type and codec rate recommendation, or other such information associated with rate adaptation.

The UE 410 can then use the prioritized bitrate indicator to identify the possible codec rate in operation 458. Then in operation 460, the UE 410 sends voice data with the new codec rate. The UL voice data can then be communicated, with the new codec rate Y, from the UE 410 to the eNB 420.

Figure 5:
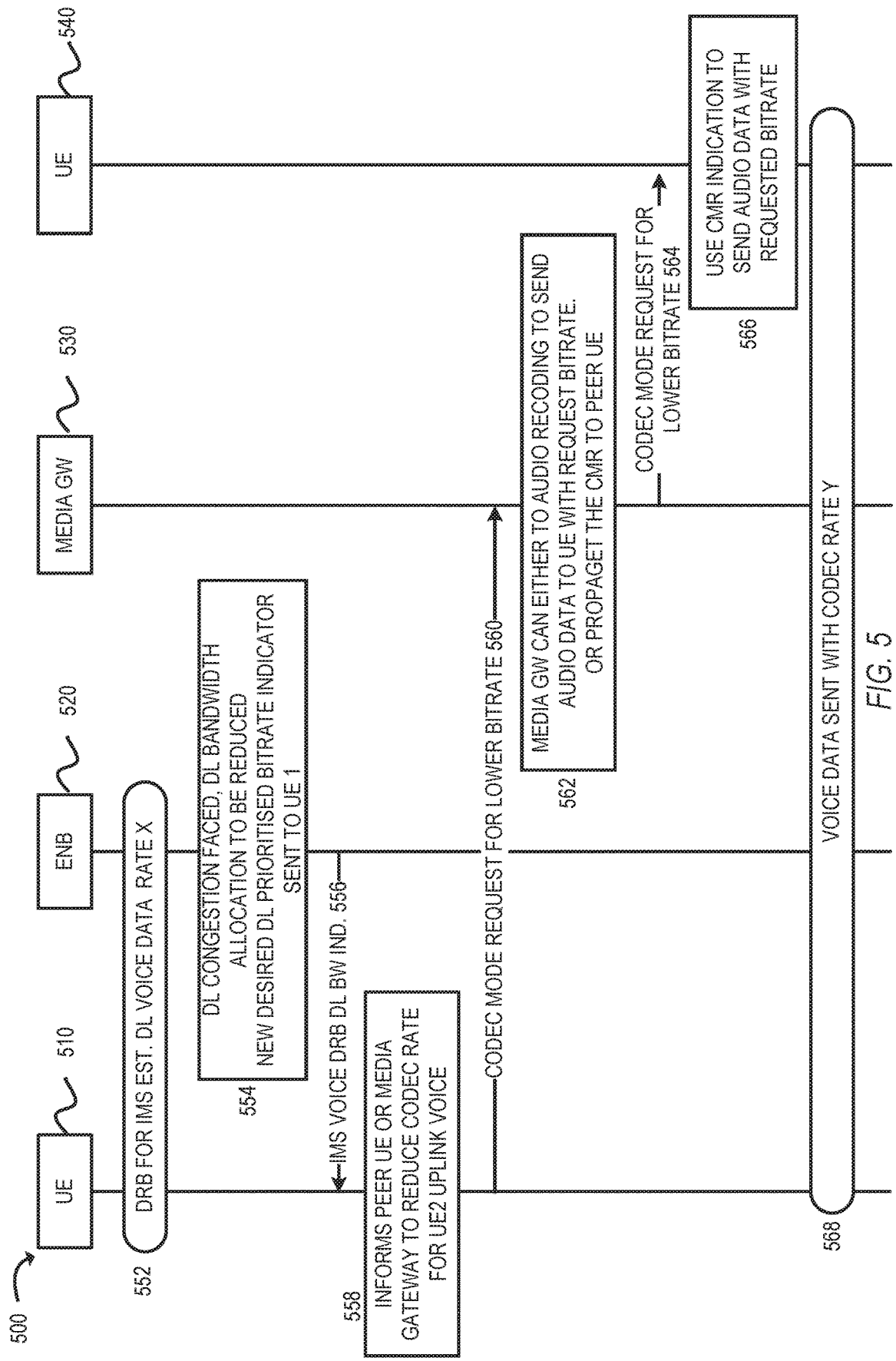
FIG. 5 depicts functionality of UE-eNB interaction to adapt downlink (DL) codec bitrate for voice based on DL bandwidth available at radio level, in accordance with some embodiments described herein.

FIG. 5 depicts functionality of UE-eNB interaction to adapt downlink (DL) codec bitrate for voice based on DL bandwidth available at radio level, in accordance with some embodiments described herein. System 500 includes UE 510, eNB 520, media gateway (GW) 530, and UE 540.

The first UE 510 interacts with the eNB 520 in operation 552 so that a DRB for VoLTE can be established, and DL voice data can be sent with codec rate X. Within the eNB 520 in operation 554, the eNB 520 identifies congestion and that a DL allocation to UE 510 is to be reduced in operation 554. The eNB 520 further identifies a new desired DL prioritized bitrate indicator to be sent to UE 510. The bitrate indicator is then sent to UE 510 in operation 556. In the embodiment of FIG. 5, the bitrate indicator is an IMS voice DRB DL bandwidth indicator. In other embodiments, other bitrate indicators may be used. Additionally, in some embodiments, if the eNB is codec aware, codec type and codec rate recommendations are provided Then in operation 558, UE 510 initiates a communication to inform peer UE 540 or media gateway 530 of an action to reduce a codec rate at UE 540 for associated uplink voice data. A CMR for a lower bitrate can be sent from UE 510 to the media gateway 530 in operation 560. The media gateway 530 can then either send audio data to UE 510 with the requested bitrate, or propagate the CMR to provide an indication to UE 540. Operations and decisions for such operations are taken at GW 530 in operation 562. In the embodiment of FIG. 5, a CMR for a lower bitrate is communicated from the GW 530 to UE 540 in operation 564. Then in operation 566, UE 540 uses the CMR from GW 530 to update audio data and associated codec selection to meet the requested bitrate, and in operation 568, voice data is communicated from UE 540 to UE 510 using the codec that meets the criteria of the requested codec bitrate.

Figure 6:
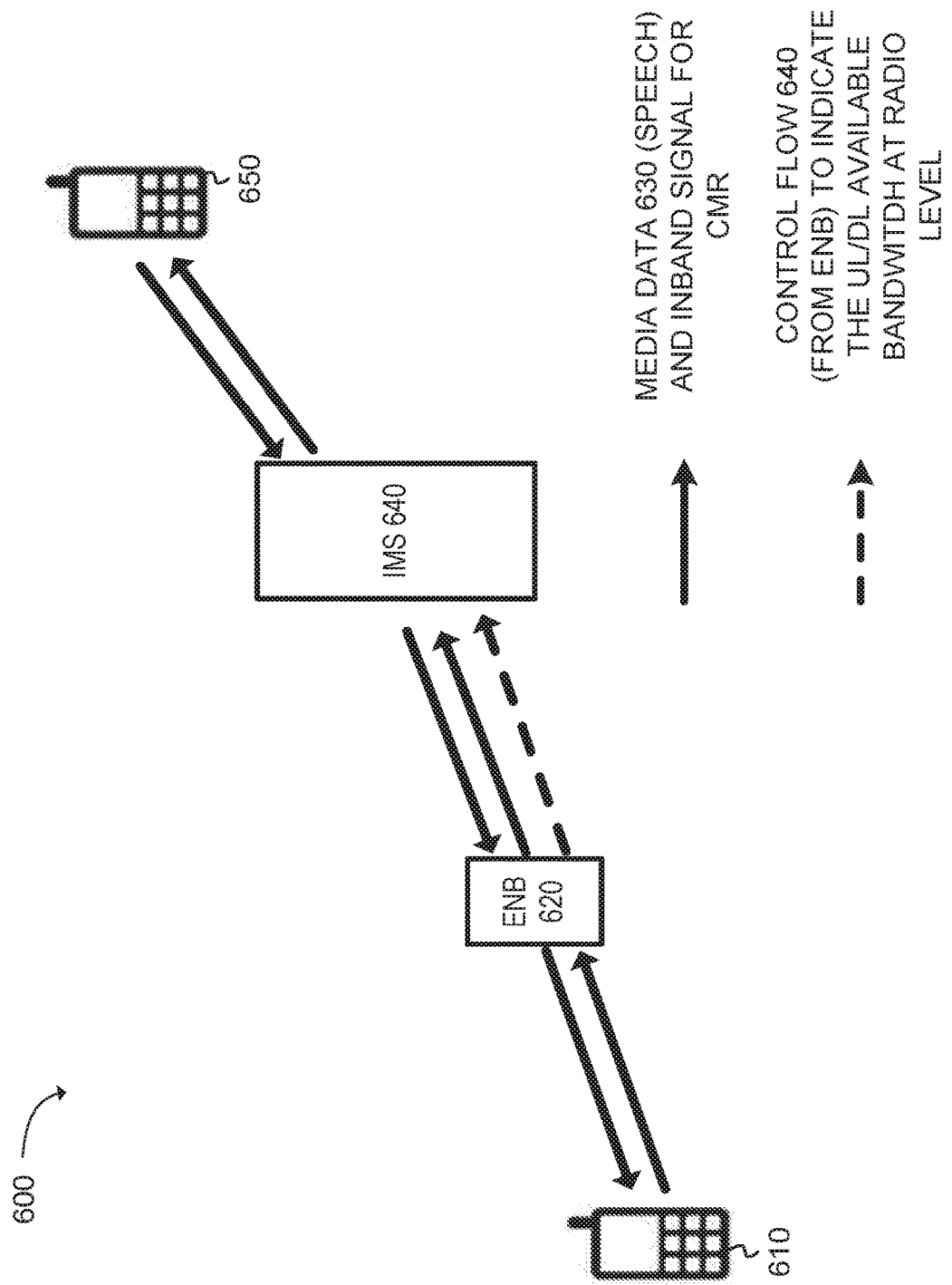
FIG. 6 illustrates RAN congestion detection with network initiated codec rate adaptation, in accordance with some embodiments described herein.

FIG. 6 illustrates RAN congestion detection with network initiated codec rate adaptation, in accordance with some embodiments described herein. System 600 of FIG. 6 includes UEs 610 and 650, eNB 620, and IMS device 625 (e.g., an IMS core network/media gateway device). In one embodiment implemented using system 600, the first UE 610 establishes a connection with eNB 620 using a codec operating at a first codec bitrate to communicate with second UE 650 via IMS device 625. When the eNB 620 detects a congestion event impacting UE 610, eNB 620 notifies IMS device 625 of the available UL and DL bandwidth for the communications between UEs 610 and 650. This notification is done with control flow 640 using bandwidth resources at radio level to convey the information from eNB 620 to IMS device 625. IMS device 625 then takes this bandwidth indication for the UL and DL from eNB 620, and uses it to send communications to both UEs (610, 650) with the appropriate codec rate for the bandwidth indication, codec type, codec rate recommendation, or other such information provided by eNB 620 (e.g. with the provided data depending on whether the eNB is codec aware or not). These communications from IMS device 625 to UEs 610, 650 may be sent using CMR.

Figure 7:
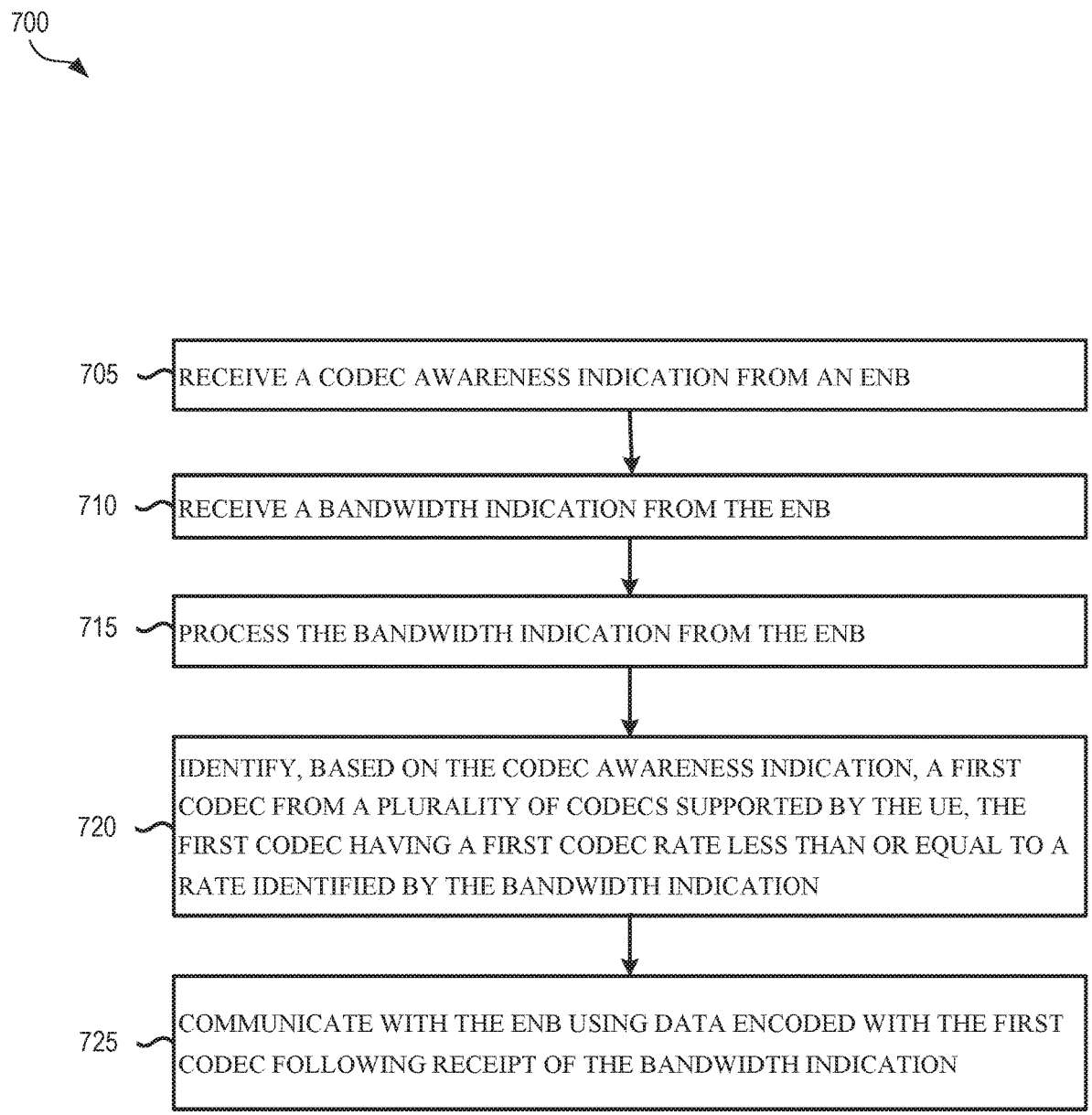
FIG. 7 illustrates an example method in accordance with embodiments described herein.

FIG. 7 illustrates an example method in accordance with embodiments described herein. In some embodiments, method 700 of FIG. 7 may be implemented by one or more processors of a UE, or an apparatus of a UE that includes processing circuitry. In other embodiments, method 700 may be implemented as computer-readable instructions in a storage media that, when executed by one or more processors of a device, cause the device to perform method 700.

As described above in related embodiments, prior to the operations of method 700, the UE performing method 700 may initiate a VoLTE or similar data communication with a remote UE via an eNB. In some embodiments, this may involve the use of an IMS or gateway device. Method 700 begins with the UE receiving a codec awareness indication from an eNB in operation 705. In some embodiments, this may be a one-bit piece of data received in a communication from the eNB indicating whether the eNB is codec aware or codec agnostic. In other embodiments, communications with the eNB in the absence of a particular piece of codec awareness data results in an implied indication where the UE accepts the absence of the data as a codec awareness indication that the eNB is not codec aware. The awareness indication may be received at any time, including before or after the initiation of the data communication with the remote UE using an initial codec bitrate.

In operation 710, the UE receives a bandwidth indication from the eNB indicating a change in bandwidth available to the UE. This is in response to a congestion event identified at the eNB in a corresponding operation. In operation 715 the UE decodes or otherwise processes the bandwidth indication, and based on the codec awareness indication, the UE identifies a first codec from a plurality of codecs supported by the UE in operation 720, where the first codec has an associated codec rate less than or equal to a rate identified by the bandwidth indication. The codec may, for example, be selected using one or more tables such as tables 1 and 2 above. The operations for selecting a codec may vary depending on the codec awareness capabilities of the eNB. If the eNB indicates a lack codec awareness or doesn't provide any data for codec awareness, the UE can provide preferred bandwidth-bitrate information to the eNB, which is reflected in the bandwidth indication received from the eNB. If the eNB indicates codec awareness capabilities, the UE can provide a list of negotiated codec/codec rates or additional information related to codec robustness such as packet loss rate robustness. The eNB may then provide codec type or codec rate recommendations in the bandwidth indication. After the first codec is selected, the UE adapts the used bandwidth by shifting to the new codec, and in operation 725 communicates data for the connection with the remote UE by communicating with the eNB using data encoded with the first codec. As described above and below, various different signaling operations may be used for these communications between the UE and the eNB in accordance with method 700.

Figure 8:
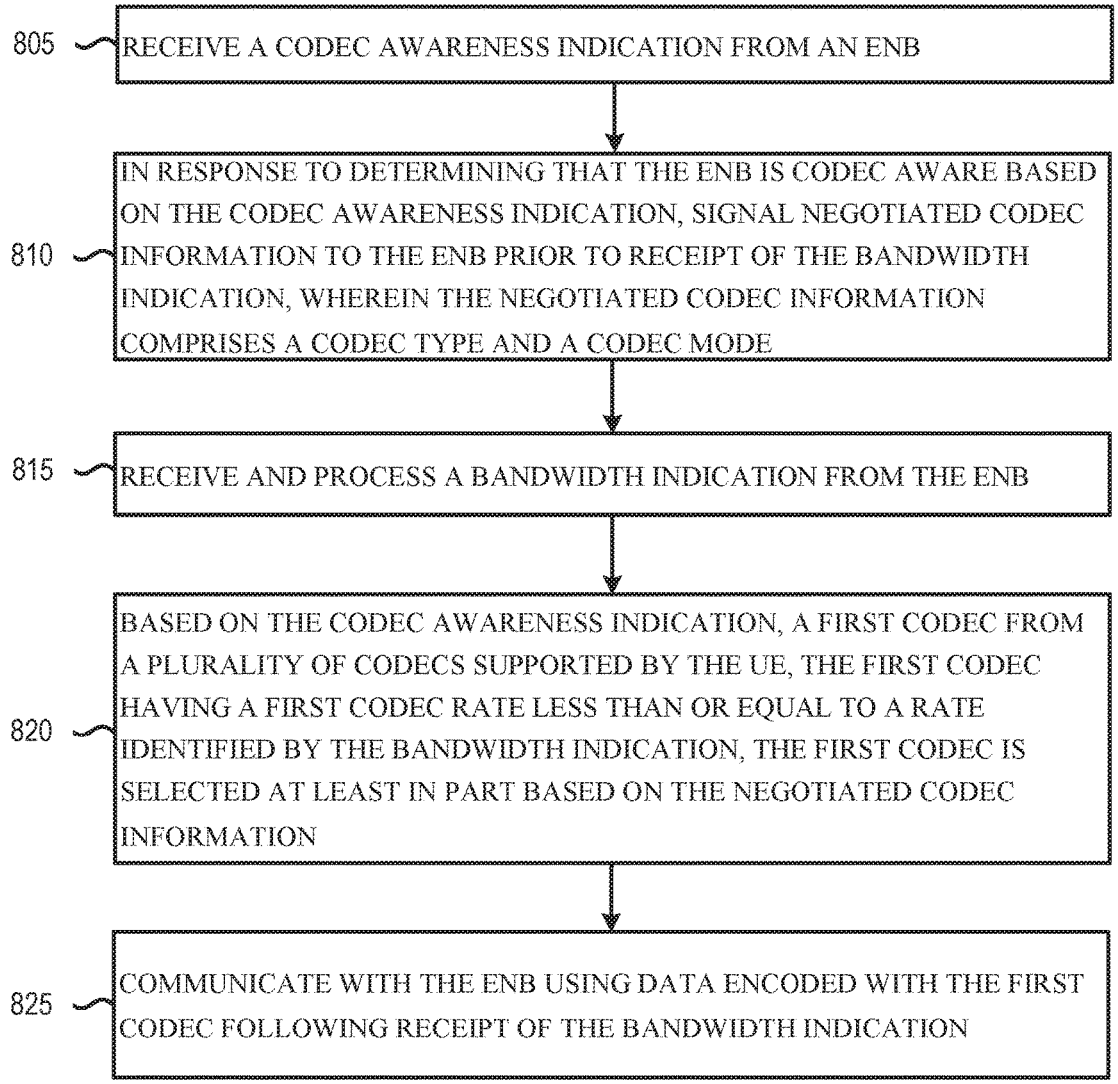
FIG. 8 illustrates an example method in accordance with embodiments described herein.

FIG. 8 illustrates another example method in accordance with embodiments described herein. In some embodiments, method 800 of FIG. 8 may be implemented by one or more processors of a UE, or an apparatus of a UE that includes processing circuitry. In other embodiments, method 800 may be implemented as computer-readable instructions in a storage media that, when executed by one or more processors of a device, cause the device to perform method 800. Method 800 describes a particular embodiment similar to method 700 where the bandwidth indication identifies the eNB as codec aware.

Similar to method 700, prior to the operations of method 800, the UE performing method 800 may initiate a VoLTE or similar data communication with a remote UE via an eNB. Method 800 begins with the UE receiving a codec awareness indication from an eNB in operation 805. In operation 810, in response to determining that the eNB is codec aware based on the codec awareness indication, the UE signals (e.g., transmits, initiates transmission, or otherwise communicates) negotiated codec information (e.g. a list of codec and codec type based on the capability and negotiated codec between the UEs) to the eNB prior to receipt of the bandwidth indication. The negotiated codec information may comprise a codec type and a codec mode. In various other embodiments, other codec information may be communicated, including any codec rate and codec compatibility information, packet loss rate information, and any other such information. This is in contrast to communications with a codec agnostic eNB, where no negotiation is performed, and the information about codec selection communicated after a bandwidth indication is received is limited (e.g., only codec bitrate information or only codec bitrate and packet loss rate information).

In operation 815, the UE then receives and processes a bandwidth indication from the eNB. As above, this bandwidth indication may be associated with a connection between the UE and a remote UE where a VoLTE connection is in process. The content of the bandwidth indication may be based on whether the eNB is codec aware or not. Codec awareness in accordance with embodiments described herein is associated with an eNB having a codec awareness capability that allows the eNB to recommend specific codec types and rates or to provide other codec specific information to a UE, rather than simply indicating bandwidths or bitrates to the UE After the bandwidth indication is received, in operation 820, based on the codec awareness based indication included in the bandwidth indication, a first codec is selected from a plurality of codecs supported by the UE, the first codec having a first codec rate less than or equal to a rate identified by the bandwidth indication, and with the first codec selected based at least in part on the negotiated codec information of operation 810. Following selection of the first (e.g., new or updated) codec, the UE adapts the used bandwidth by shifting to the new codec, and in operation 825 communicates data for the connection with the remote UE by communicating with the eNB using data encoded with the first codec.

Methods 700 and 800 describe particular embodiments, but it will be apparent that additional methods in accordance with the embodiments described herein are possible with repeated or intervening operations to achieve UE provisioning. An additional set of non-exhaustive embodiments is further presented below.

Example Embodiments

In addition to the above example embodiments, any combination of operations or elements described above may be integrated into various embodiments described herein.

Example 1 may include an evolved Node B (eNB) of a 3GPP network comprising processing circuitry to determine the available bandwidth at radio level for UL and DL, transmitting circuitry to notify a User Equipment (UE) about the available bandwidth for data transmission in UL and DL, and a receiving circuitry to receive a notification from a UE about a preferred codec bitrate.

Example 2 may include the eNB of example 1 and/or some other example herein, where the available bandwidth at radio level for UL includes the prioritized bitrate for the logical channel in uplink that has been configured to carry data.

Example 3 may include the eNB of example 1 and/or some other example herein, where the available bandwidth at radio level for DL includes the recommended prioritized bitrate for the logical channel in downlink that has been configured to carry data.

Example 4 may include the eNB of example 1 and/or some other example herein, where the available bandwidth at radio level for UL and DL is determined for data transmission over logical channels configured for voice or video.

Example 5 may include the eNB of example 1 and/or some other example herein, where the available bandwidth at radio level for UL and DL is determined based on the radio condition or the number of users/UEs to serve.

Example 6 may include the eNB of example 1 and/or some other example herein, where the notification about the available bandwidth for data transmission in UL and DL is transmitted by a RRC or MAC message.

Example 7 may include the eNB of example 1 and/or some other example herein, where the notification about a preferred codec bitrate is received by a RRC or MAC message.

Example 7a may include the eNB of example 1 and/or some other example herein, where the eNB additionally signals one bit of information to indicate whether it is codec aware or codec agnostic.

Example 8 may include a UE of a 3GPP network comprising receiving circuitry to receive from the eNB a notification about the available bandwidth for data transmission in UL and DL, processing circuitry to determine an appropriate codec type and codec bitrate to apply, and a transmitting circuitry to transmit a notification to the eNB about a preferred codec bitrate.

Example 9 may include the UE of example 8 and/or some other example herein, where the available bandwidth at radio level for UL includes the prioritized bitrate for the logical channel in uplink that has been configured to carry data.

Example 10 may include the UE of example 8 and/or some other example herein, where the available bandwidth at radio level for DL includes the recommended prioritized bitrate for the logical channel in downlink that has been configured to carry data.

Example 11 may include the UE of example 8 and/or some other example herein, where the appropriate codec type and codec bitrate to apply is determined for voice or video.

Example 12 may include the UE of example 8 and/or some other example herein, where the notification about the available bandwidth for data transmission in UL and DL is received by a RRC or MAC message.

Example 13 may include the UE of example 8 and/or some other example herein, where the preferred codec bitrate is determined based on the voice or video quality and the redundancy required.

Example 14 may include the UE of example 8 and/or some other example herein, where the notification about a preferred codec bitrate is transmitted by a RRC or MAC message.

Example 15 may include the UE of example 10 and/or some other example herein, comprising a transmitting circuitry to transmit an indication of codec type and codec bitrate to apply to an entity of the 3GPP network.

Example 16 may include the UE of example 15 and/or some other example herein, where the entity is another UE or media gateway.

Example 17 may include the UE of example 15 and/or some other example herein, where the indication is transmitted by RTP or SIP message.

Example 18 may include the UE of example 8 and/or some other example herein, where the notification about a preferred codec bitrate includes a negotiated codec bitrate range.

Example 19 may include the UE of example 18 and/or some other example herein, where the negotiated codec bitrate range includes a minimum and a maximum bitrate.

Example 20 may include the UE of example 18 and/or some other example herein, where the notification about a preferred codec bitrate includes additional information such as packet loss rate, supported codec types and modes.

Example 21 may include the UE of example 18, and/or some other example herein, where the UE adaptively decides what information to signal to the eNB depending on the indication from the eNB on whether is it is codec aware or codec agnostic.

Example 22 may include an apparatus comprising means to perform one or more elements of a method described in or related to any of examples 1-21, or any other method or process described herein.

Example 23 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 24 may include an apparatus comprising logic, modules, and/or circuitry to perform one or more elements of a method described in or related to any of examples 1-21, or any other method or process described herein.

Example 25 may include a method, technique, or process as described in or related to any of examples 1-21, or portions or parts thereof.

Example 26 may include an apparatus comprising: one or more processors and one or more computer-readable media comprising instructions that, when executed by the one or more processors, cause the one or more processors to perform the method, techniques, or processes as described in or related to any of examples 1-21, or portions thereof.

Example 27 may include a method of communicating in a wireless network as shown and described herein.

Example 28 may include a system for providing wireless communication as shown and described herein.

Example 29 may include a device for providing wireless communication as shown and described herein.

Example 30 is an apparatus of a user equipment (UE), the apparatus comprising: an interface configured to receive a bandwidth indication and a codec awareness indication from an evolved node B (eNB) wherein the codec awareness indication identifies a codec awareness capability of the eNB; and processing circuitry coupled to the memory and configured to: process the bandwidth indication from the eNB; and identify, based on the bandwidth indication, a first codec from a plurality of codecs supported by the UE, the first codec having a first codec rate less than or equal to a rate identified by the bandwidth indication, wherein the bandwidth indication is based at least in part on the codec awareness capability of the eNB, wherein the interface is further configured to communicate with the eNB using data encoded with the first codec following receipt of the bandwidth indication.

In Example 31, the subject matter of Example 30 optionally includes, wherein the processing circuitry is further configured to: process the codec awareness indication from the eNB; and in response to determining that the eNB is codec aware based on the codec awareness indication, signal negotiated codec information to the eNB prior to receipt of the bandwidth indication, wherein the negotiated codec information comprises a codec type and a codec mode, wherein the first codec is selected at least in part based on the negotiated codec information.

In Example 32, the subject matter of any one or more of Examples 30-31 optionally include, wherein processing circuitry is further configured to: process the codec awareness indication from the eNB: and in response to determining that the eNB is not codec aware based on the codec awareness indication, signal a bitrate range and a packet loss rate to the eNB prior to receipt of the bandwidth indication, wherein the first codec is selected at least in part based on the negotiated codec information.

In Example 33, the subject matter of any one or more of Examples 30-32 optionally include, wherein the processing circuitry is further configured to: encode initial voice data using a second codec associated with a second codec rate for uplink (UL) communication to the eNB, therein the bandwidth indication comprises a reduced bandwidth allocation, and wherein the second codec rate is less than the first codec rate.

In Example 34, the subject matter of any one or more of Examples 30-33 optionally include, wherein the bandwidth indication comprises an Internet Protocol multimedia subsystem (IMS) voice Data Radio Bearer (DRB) UL bandwidth (BW) indication.

In Example 35, the subject matter of any one or more of Examples 30-34 optionally include-5, further comprising: a memory coupled to the processing circuitry, the memory comprising a table of the plurality of codecs supported by the UE, an associated sampling rate for each codec, and an associated codec rate for each codec of the plurality of codecs, wherein the processing circuitry identifies the first codec from the table of the memory.

In Example 36, the subject matter of any one or more of Examples 30-35 optionally include-5, wherein the eNB determines the bandwidth indication based on a radio condition and a number of served UEs.

In Example 37, the subject matter of any one or more of Examples 30-36 optionally include-5, wherein the bandwidth indication is received via Radio Resource Control (RRC) signaling from the eNB.

In Example 38, the subject matter of any one or more of Examples 30-37 optionally include-5, wherein the bandwidth indication is received via inband signaling using a media access control (MAC) element.

In Example 39, the subject matter of any one or more of Examples 30-38 optionally include-5, wherein the processing circuitry is further configured to decode a preferred codec bitrate received from the eNB via L3 signaling prior to identification of the first codec.

In Example 40, the subject matter of any one or more of Examples 30-39 optionally include-5, wherein the bandwidth indication comprises a UL bandwidth and a downlink (DL) bandwidth different than the UL bandwidth.

In Example 41, the subject matter of any one or more of Examples 30-40 optionally include-3, wherein the processing circuitry further identifies the first codec by determining a computation of bandwidth based on the first codec rate and a set of additional data, wherein the additional data comprises a protocol layer header.

In Example 42, the subject matter of any one or more of Examples 30-41 optionally include-5, wherein the processing circuitry is further configured to: process the bandwidth indication to determine a downlink bandwidth indication: identify the first codec based on the downlink bandwidth indication; and initiate transmission of a preferred codec bitrate indication to the eNB, wherein the preferred codec bitrate is based on an observed output quality level, a packet loss rate, or a jitter level.

In Example 43, the subject matter of Example 42 optionally includes, wherein the preferred codec bitrate is negotiated with a peer UE by the UE using a codec negotiation procedure with a minimum and a maximum bitrate.

In Example 44, the subject matter of any one or more of Examples 42-43 optionally include, wherein the processing circuitry is further configured to communicate the preferred codec bitrate to a remote peer or a media gateway via the eNB using Real-time Transport Protocol (RTP) Codec Mode Request (CMR).

In Example 45, the subject matter of any one or more of Examples 42-44 optionally include, wherein the processing circuitry is further configured to communicate the preferred codec bitrate to a remote peer or a media gateway via the eNB using a session initiated protocol (SIP) re-invite to negotiate the preferred codec and an associated bitrate when RTP CMR is not possible.

In Example 46, the subject matter of any one or more of Examples 30-45 optionally include-16, further comprising an antenna coupled to the processing circuitry and the interface, the antenna configured to receive the bandwidth indication and to transmit the data encoded with the first codec.

Example 47 is a non-transitory computer-readable medium comprising instructions that, when executed by processing circuitry of an apparatus of a user equipment (UE), causes the apparatus to: decode a bandwidth indication from an evolved node B (eNB); process the bandwidth indication from the eNB; and identify a first codec having a first codec rate less than or equal to the bandwidth indication from a plurality of codecs supported by the UE, and communicate with the eNB using data encoded with the first codec following receipt of the bandwidth indication.

In Example 48, the subject matter of Example 47 optionally includes, wherein the instructions further cause the apparatus to: process a one-bit indication from the eNB identifying the eNB as codec aware or codec agnostic; communicate a bitrate range and a packet loss rate to the UE if the eNB is codec agnostic; and negotiate a codec type and mode with the UE if the eNB is codec aware.

Example 49 is an apparatus of an evolved node B (eNB), the apparatus comprising: an interface configured to: communicate first voice or video data between a first user equipment (UE) and a second UE using a first codec; and communicate signaling for congestion detection; and control circuitry coupled to the interface and configured to: process the congestion detection signaling to determine a reduced uplink and downlink bandwidth for the first UE; initiate communication of the reduced uplink and downlink bandwidth for the first UE to an Internet Protocol multimedia subsystem (IMS); relay a bitrate adjustment request from the IMS to the first UE in response to the communication of the reduced uplink and downlink bandwidth for the first UE; and receive, from the first UE, data encoded with a second codec, wherein the second codec is based on the bitrate adjustment request.

In Example 50, the subject matter of Example 49 optionally includes, wherein the bitrate adjustment request comprises a Codec Mode Request (CMR).

In Example 51, the subject matter of any one or more of Examples 49-50 optionally include, wherein the bitrate adjustment request is associated with a re-invite to the first UE and the second UE from the IMS.

Example 52 is a non-transitory computer-readable medium comprising instructions that, when executed by processing circuitry of an apparatus of an evolved node B (eNB), causes the apparatus to: communicate first voice or video data between a first UE and a second UE using a first codec; communicate signaling for congestion detection: process the congestion detection signaling to determine a reduced uplink and downlink bandwidth for the first UE; initiate communication of a bandwidth indication based on the reduced uplink and downlink bandwidth to the first UE; and relay second voice or video data between the first UE and the second UE using a second codec selected by the first UE based on the bandwidth indication.

In Example 53, the subject matter of Example 52 optionally includes, wherein the instructions further cause the apparatus to: communicate the bandwidth indication with a one-bit indication identifying the eNB as codec aware or codec agnostic: receive a bitrate range and a packet loss rate if the eNB is codec agnostic; and negotiate a codec type and mode with the UE if the eNB is codec aware.

In Example 54, the subject matter of any one or more of Examples 52-53 optionally include, wherein the instructions further cause the apparatus to: communicate the bandwidth indication without an indication identifying the eNB as codec aware or codec agnostic; receive a bitrate range and a packet loss rate if the eNB is codec agnostic in response to the bandwidth indication.

Example 55 is an apparatus of a user equipment (UE), the apparatus comprising: means for receiving a bandwidth indication and a codec awareness indication from an evolved node B (eNB) and communicating with the eNB using data encoded with a first codec following receipt of a bandwidth indication, wherein the codex awareness indication identifies a codec awareness capability of the eNB, means for processing the bandwidth indication from the eNB; and means for identifying, based on the codec awareness indication, a first codec from a plurality of codecs supported by the UE, the first codec having a first codec rate less than or equal to a rate identified by the bandwidth indication, wherein the bandwidth indication is based at least in part on the codex awareness capability of the eNB.

In Example 56, the subject matter of Example 55 optionally includes further comprising: means for processing the codec awareness indication from the eNB; and means for signaling negotiated codec information to the eNB prior to receipt of the bandwidth indication in response to determining that the eNB is codec aware based on the codec awareness indication, wherein the negotiated codec information comprises a codec type and a codec mode, wherein the first codec is selected at least in part based on the negotiated codec information.

In Example 57, the subject matter of any one or more of Examples 55-56 optionally include, further comprising: means for encoding initial voice data using a second codec associated with a second codec rate for uplink (UL) communication to the eNB, wherein the bandwidth indication comprises a reduced bandwidth allocation, and wherein the second codec rate is less than the first codec rate.

In Example 58, the subject matter of any one or more of Examples 55-57 optionally include, wherein the bandwidth indication comprises an Internet Protocol multimedia subsystem (IMS) voice Data Radio Bearer (DRB) UL bandwidth (BW) indication.

In Example 59, the subject matter of any one or more of Examples 55-58 optionally include-29, further comprising: means for storing a plurality of codecs supported by the UE, an associated sampling rate for each codec, and an associated codec rate for each codec of the plurality of codecs, wherein the processing circuitry identifies the first codec from the table of the memory.

In Example 60, the subject matter of any one or more of Examples 55-59 optionally include-29, wherein the eNB determines the bandwidth indication based on a radio condition and a number of served UEs.

In Example 61, the subject matter of any one or more of Examples 55-60 optionally include-29, wherein the bandwidth indication is to received via Radio Resource Control (RRC) signaling from the eNB.

In Example 62, the subject matter of any one or more of Examples 55-61 optionally include-29, wherein the bandwidth indication is received via inband signaling using a media access control (MAC) element.

In Example 63, the subject matter of any one or more of Examples 55-62 optionally include-29, further comprising means for decoding a preferred codec bitrate received from the eNB via L3 signaling prior to identification of the first codec.

In Example 64, the subject matter of any one or more of Examples 55-63 optionally include-29, wherein the bandwidth indication comprises a UL bandwidth and a downlink (DL) bandwidth different than the UL bandwidth.

In Example 65, the subject matter of any one or more of Examples 55-64 optionally include-29, further comprising means for identifying the first codec by determining a computation of bandwidth based on the first codec rate and a set of additional data, wherein the additional data comprises a protocol layer header.

In Example 66, the subject matter of any one or more of Examples 55-65 optionally include-29, further comprising: means for processing the bandwidth indication to determine a downlink bandwidth indication; means for identifying the first codec based on the downlink bandwidth indication: and means for initiating transmission of a preferred codec bitrate indication to the eNB, wherein the preferred codec bitrate is based on an observed output quality level, a packet loss rate, or a jitter level.

In Example 67, the subject matter of Example 66 optionally includes, wherein the preferred codec bitrate is negotiated with a peer UE by the UE using a codec negotiation procedure with a minimum and a maximum bitrate.

In Example 68, the subject matter of any one or more of Examples 55-67 optionally include-38, further comprising means for receiving the bandwidth indication; and means for transmitting the data encoded with the first codec.

Example 69 is a method performed by a user equipment (UE) for codec bitrate adaptation the method comprising: decoding a bandwidth indication from an evolved node B (eNB); processing the bandwidth indication from the eNB: and identifying a first codec having a first codec rate less than or equal to the bandwidth indication from a plurality of codecs supported by the UE, and communicating with the eNB using data encoded with the first codec following receipt of the bandwidth indication.

In Example 70, the subject matter of Example 69 optionally includes further comprising: process a one-bit indication from the eNB identifying the eNB as codec aware or codec agnostic: communicate a bitrate range and a packet loss rate to the UE if the eNB is codec agnostic; and negotiate a codec type and mode with the UE if the eNB is codec aware.

Example 71 is an apparatus of an evolved node B (eNB), the apparatus comprising: means for communicating first voice or video data between a first user equipment (UE) and a second UE using a first codec and signaling for congestion detection; and means for processing the congestion detection signaling to determine a reduced uplink and downlink bandwidth for the first UE; means for initiating communication of the reduced uplink and downlink bandwidth for the first UE to an Internet Protocol multimedia subsystem (IMS); means for relaying a bitrate adjustment request from the IMS to the first UE in response to the communication of the reduced uplink and downlink bandwidth for the first UE: and means for receiving, from the first UE, data encoded with a second codec, wherein the second codec is based on the bitrate adjustment request.

In Example 72, the subject matter of Example 71 optionally includes, wherein the bitrate adjustment request comprises a Codec Mode Request (CMR).

In Example 73, the subject matter of any one or more of Examples 71-72 optionally include, wherein the bitrate adjustment request is associated with a re-invite to the first UE and the second UE from the IMS.

Example 74 is a method performed by an apparatus of an evolved node B (eNB) for codec bitrate adaptation, the method comprising: communicating first voice or video data between a first UE and a second UE using a first codec; communicating signaling for congestion detection; processing the congestion detection signaling to determine a reduced uplink and downlink bandwidth for the first UE; initiating communication of a bandwidth indication based on the reduced uplink and downlink bandwidth to the first UE; and relaying second voice or video data between the first UE and the second UE using a second codec selected by the first UE based on the bandwidth indication.

In Example 75, the subject matter of Example 74 optionally includes, further comprising: communicating the bandwidth indication with a one-bit indication identifying the eNB as codec aware or codec agnostic; receiving a bitrate range and a packet loss rate if the eNB is codec agnostic; and negotiating a codec type and mode with the UE if the eNB is codec aware.

In Example 76, the subject matter of any one or more of Examples 74-75 optionally include, further comprising: communicating the bandwidth indication without an indication identifying the eNB as codec aware or codec agnostic; receiving a bitrate range and a packet loss rate if the eNB is codec agnostic in response to the bandwidth indication.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments. Additionally, other example embodiments may include any examples described above with the individual operations or device elements repeated or ordered with intervening elements or operations in any functional order.

Figure 9:
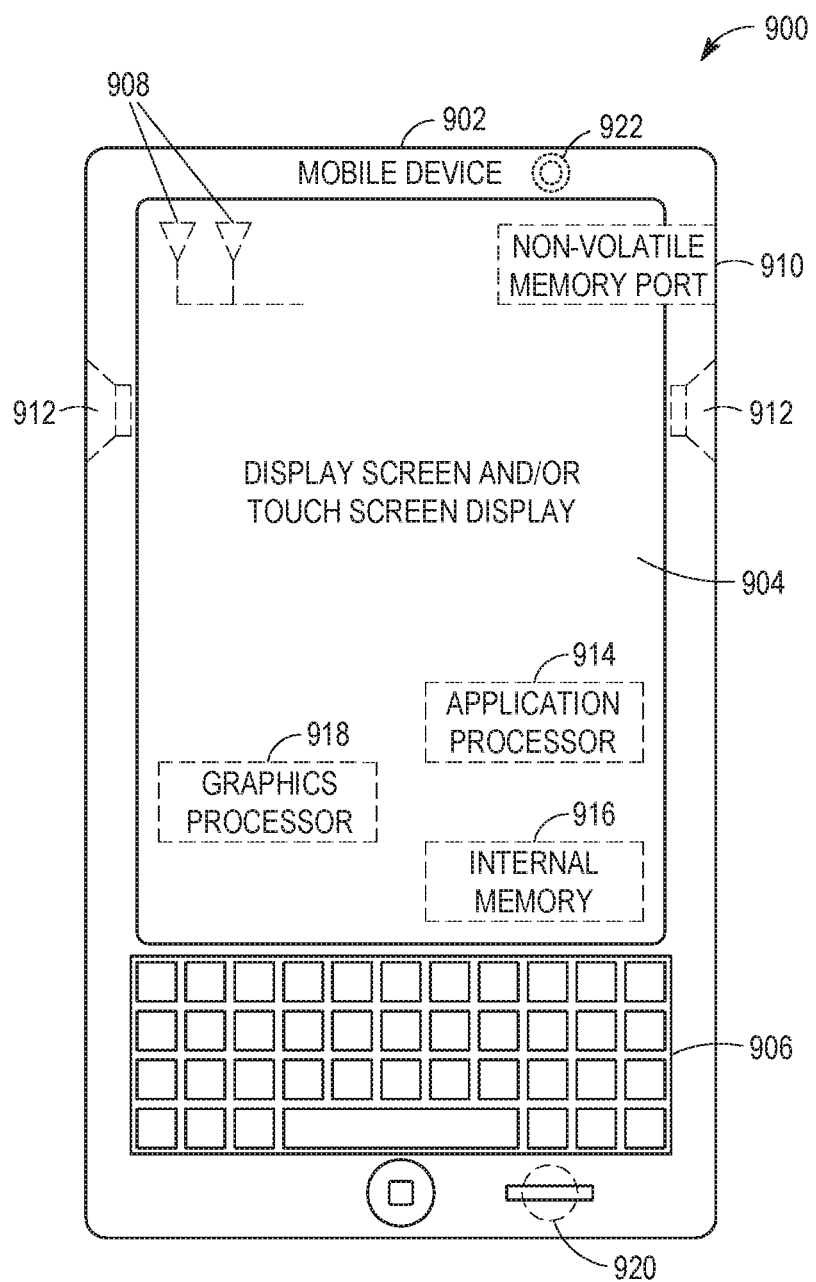
FIG. 9 illustrates an example UE which may be configured for specialized operation or otherwise used with various embodiments described herein.

FIG. 9 shows an example UE 900 which may operate with codec selection and adaptation in accordance with various embodiment described herein. The UE 900 may be an implementation of the UE 102, 310, 350, 410, 510, 540, 610 or any device described herein. The UE 900 can include one or more antennas 908 configured to communicate with a transmission station, such as a base station (BS), an eNB, or another type of wireless wide area network (WWAN) access point. The UE 900 can be configured to communicate using at least one wireless communication standard including 3GPP LTE, WiMAX®, High-Speed Packet Access (HSPA), Bluetooth, and Wi-Fi®. The UE 900 can communicate using separate antennas for each wireless communication standard or shared antennas for multiple wireless communication standards. The UE 900 can communicate in a WLAN, a wireless personal area network (WPAN), and/or a WWAN.

FIG. 9 also shows a microphone 920 and one or more speakers 912 that can be used for audio input and output to and from the UE 900. As a headed device, UE 900 includes one or more interfaces for a UI. UE 900 particularly includes display screen 904, which can be a liquid crystal display (LCD) screen or another type of display screen such as an organic light-emitting diode (OLED) display. The display screen 904 can be configured as a touch screen. The touch screen can use capacitive, resistive, or another type of touch-screen technology. An application processor 914 and a graphics processor 918 can be coupled to an internal memory 916 to provide processing and display capabilities. A non-volatile memory port 910 can also be used to provide data I/O options to a user. The non-volatile memory port 910 can also be used to expand the memory capabilities of the UE 900. A keyboard 906 can be integrated with the UE 900 or wirelessly connected to the UE 900 to provide additional user input. A virtual keyboard can also be provided using the touch screen. A camera 922 located on the front (display screen 904) side or the rear side of the UE 900 can also be integrated into a housing 902 of the UE 900.

Figure 10:
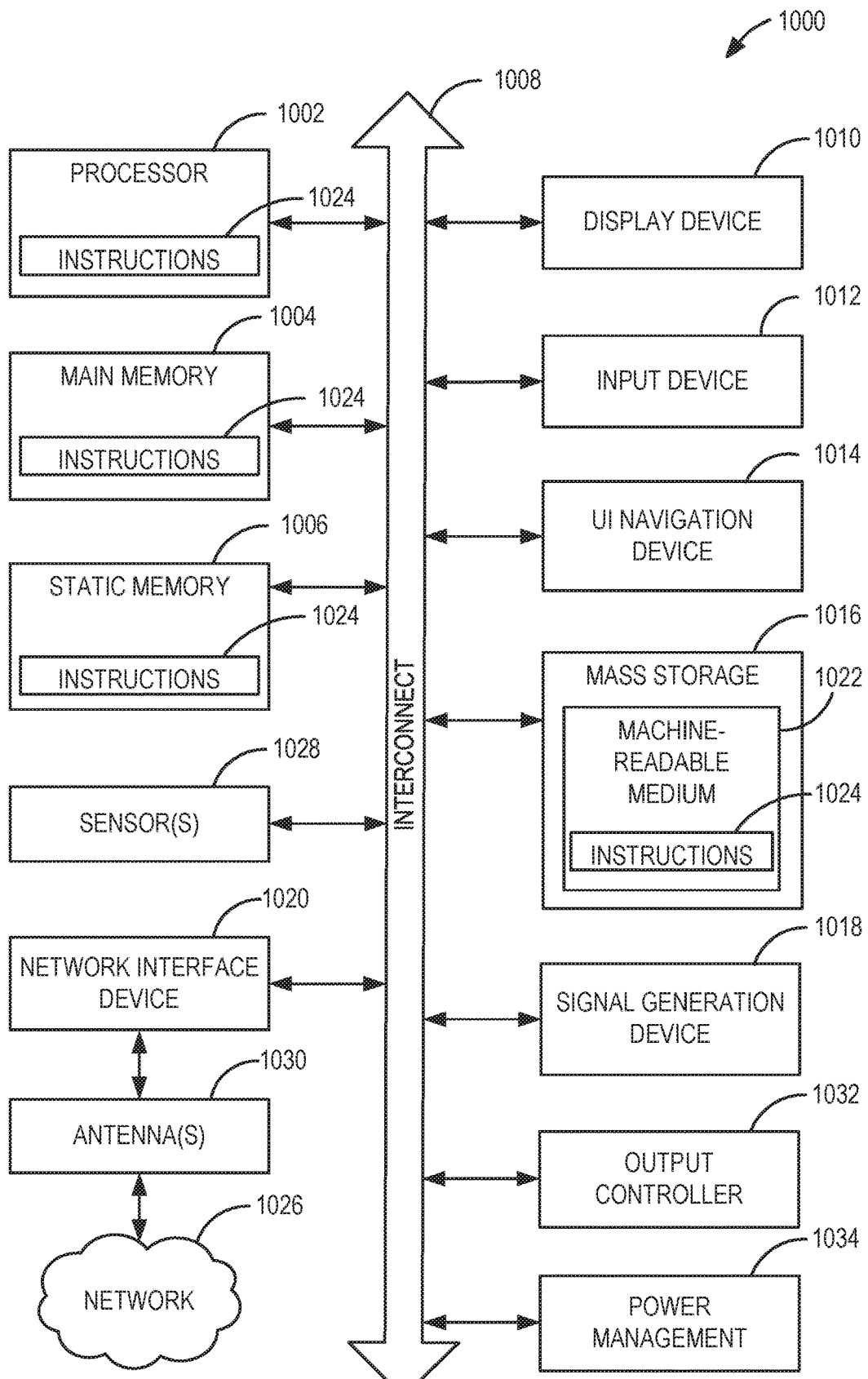
FIG. 10 is a block diagram illustrating an example computer system machine which may be used in association with various embodiments described herein.

FIG. 10 is a block diagram illustrating an example computer system machine 1000 upon which any one or more of the methodologies herein discussed can be run, and which may be used to implement any eNB 104, 250, 320, 420, 520, or 620, any UE described herein, any gateway or IMS devices 530 or 640, or any other device described herein. In various alternative embodiments, the computer system machine 1000 operates as a standalone device or can be connected (e.g., networked) to other machines. In a networked deployment, the computer system machine 1000 can operate in the capacity of either a server or a client machine in server-client network environments, or it can act as a peer machine in peer-to-peer (or distributed) network environments. The computer system machine 1000 can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, a network switch, a network bridge, or any machine capable of executing instructions (sequential or otherwise) that specify actions to be taken by that machine. Further, while only a single computer system machine 1000 is illustrated, the term "machine" shall also be taken to include any collection of machines that individually or jointly execute a set (or multiple sets) of instructions to perform any one or more of the methodologies discussed herein.

The example computer system machine 1000 includes a processor 1002 (e.g., a central processing unit (CPU), a graphics processing unit (GPU), or both), a main memory 1004, and a static memory 1006, which communicate with each other via an interconnect 1008 (e.g., a link, a bus, etc.). The computer system machine 100 can further include a video display device 1010, an alphanumeric input device 1012 (e.g., a keyboard), and a user interface (UI) navigation device 1014 (e.g., a mouse). In one embodiment, the video display device 1010, alphanumeric input device 1012, and UI navigation device 1014 are a touch screen display. The computer system machine 1000 can additionally include a mass storage device 1016 (e.g., a drive unit), a signal generation device 1018 (e.g., a speaker), an output controller 1032, a power management controller 1034, a network interface device 1020 (which can include or operably communicate with one or more antennas 1030, transceivers, or other wireless communications hardware), and one or more sensors 1028, such as a GPS sensor, compass, location sensor, accelerometer, or other sensor.

The mass storage device 1016 includes a machine-readable medium 1022 on which is stored one or more sets of data structures and instructions 1024 (e.g., software) embodying or utilized by any one or more of the methodologies or functions described herein. The instructions 1024 can also reside, completely or at least partially, within the main memory 1004, static memory 1006, and/or processor 1002 during execution thereof by the computer system machine 1000, with the main memory 1004, the static memory 1006, and the processor 1002 also constituting machine-readable media.

While the machine-readable medium 1022 is illustrated in an example embodiment to be a single medium, the term "machine-readable medium" can include a single medium or multiple media (e.g., a centralized or distributed database, and/or associated caches and servers) that store the one or more instructions 1024. The term "machine-readable medium" shall also be taken to include any tangible medium that is capable of storing, encoding, or carrying instructions (e.g., instructions 1024) for execution by the machine and that cause the machine to perform any one or more of the methodologies of the present disclosure, or that is capable of storing, encoding, or carrying data structures utilized by or associated with such instructions.

The instructions 1024 can further be transmitted or received over a communications network 1026 using a transmission medium via the network interface device 1020 utilizing any one of a number of well-known transfer protocols (e.g., hypertext transfer protocol (HTTP)). The term "transmission medium" shall be taken to include any medium that is capable of storing, encoding, or carrying instructions for execution by the machine, and includes digital or analog communications signals or other intangible media to facilitate communication of such software.

Various techniques, or certain aspects or portions thereof, may take the form of program code (i.e., instructions 1024) embodied in tangible media, such as floppy diskettes, CD-ROMs, hard drives, non-transitory computer-readable storage media, or any other machine-readable storage medium wherein, when the program code is loaded into and executed by a machine, such as a computer, the machine becomes an apparatus for practicing the various techniques. In the case of program code execution on programmable computers, the computer may include a processor, a storage medium readable by the processor (including volatile and non-volatile memory and/or storage elements), at least one input device, and at least one output device. The volatile and non-volatile memory and/or storage elements may be a Random Access Memory (RAM), Erasable Programmable Read-Only Memory (EPROM), flash drive, optical drive, magnetic hard drive, or other medium for storing electronic data. The eNB and UE may also include a transceiver module, a counter module, a processing module, and/or a clock module or timer module. One or more programs that may implement or utilize the various techniques described herein may use an application programming interface (API), reusable controls, and the like. Such programs may be implemented in a high-level procedural or object-oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, IEEE 902.11, and Bluetooth communication standards. Various alternative embodiments may use a variety of other WWAN, WLAN, and WPAN protocols and standards in connection with the techniques described herein. These standards include, but are not limited to, other standards from 3GPP (e.g., HSPA+, UMTS), IEEE 1002.16 (e.g., 1002.16p), or Bluetooth (e.g., Bluetooth 10.0, or like standards defined by the Bluetooth Special Interest Group) standards families. Other applicable network configurations can be included within the scope of the presently described communication networks. It will be understood that communications on such communication networks can be facilitated using any number of personal area networks (PANs), local area networks (LANs), and wide area networks (WANs), using any combination of wired or wireless transmission mediums.

Figure 11:
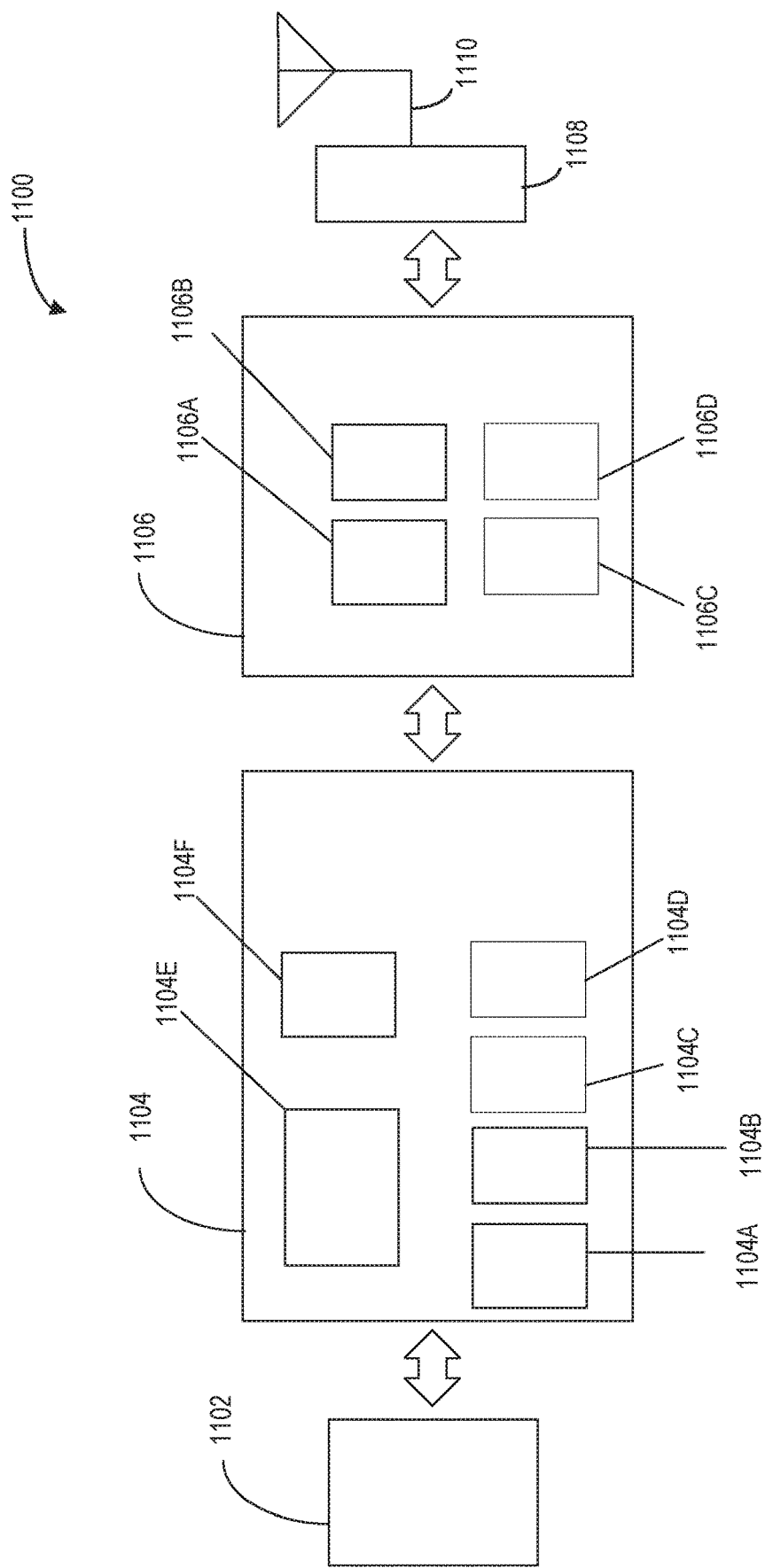
FIG. 11 illustrates aspects of a UE, a wireless apparatus, or a device, in accordance with some example embodiments.

Embodiments described herein may be implemented into a system using any suitably configured hardware and/or software. FIG. 11 illustrates components of a UE 1100 in accordance with some embodiments. At least some of the components shown may be used in the UE 102 (or eNB 104) shown in FIG. 1. The UE 1100 and other components may be configured to use the synchronization signals as described herein. The UE 1100 may be one of the UEs 102 shown in FIG. 1 and may be a stationary, non-mobile device or may be a mobile device. In some embodiments, the UE 1100 may include application circuitry 1102, baseband circuitry 1104. Radio Frequency (RF) circuitry 1106, front-end module (FEM) circuitry 1108, and one or more antennas 1110, coupled together at least as shown. At least some of the baseband circuitry 1104, RF circuitry 1106, and FEM circuitry 1108 may form a transceiver. In some embodiments, other network elements, such as the eNB 104, may contain some or all of the components shown in FIG. 11. Other of the network elements, such as a mobility management entity (MME), may contain an interface, such as the S1 interface, to communicate with the eNB 104 over a wired connection regarding the UE 1100.

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the UE 1100.

The baseband circuitry 1104 may include circuitry such as, but not limited to, one or more single-core or multi-core processors. The baseband circuitry 1104 may include one or more baseband processors and/or control logic to process baseband signals received from a receive signal path of the RF circuitry 1106 and to generate baseband signals for a transmit signal path of the RF circuitry 1106. The baseband circuitry 1104 may interface with the application circuitry 1102 for generation and processing of the baseband signals and for controlling operations of the RF circuitry 1106. For example, in some embodiments, the baseband circuitry 1104 may include a second generation (2G) baseband processor 1104a, third generation (3G) baseband processor 1104b, fourth generation (4G) baseband processor 1104c, and/or other baseband processor(s) 1104d for other existing generations, generations in development, or generations to be developed in the future (e.g., fifth generation (5G), etc.). The baseband circuitry 1104 (e.g., one or more of the baseband processors 1104a-d) may handle various radio control functions that enable communication with one or more radio networks via the RF circuitry 1106. The radio control functions may include, but are not limited to, signal modulation/demodulation, encoding/decoding, radio frequency shifting, etc. In some embodiments, modulation/demodulation circuitry of the baseband circuitry 1104 may include FFT, precoding, and/or constellation mapping/de-mapping functionality. In some embodiments, encoding/decoding circuitry of the baseband circuitry 1104 may include convolution, tail-biting convolution, turbo, Viterbi, and/or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1104e of the baseband circuitry 1104 may be configured to run elements of the protocol stack for signaling of the PHY, MAC, RLC, PDCP, and/or RRC layers. In some embodiments, the baseband circuitry 1104 may include one or more audio digital signal processor(s) (DSPs) 1104f. The audio DSP(s) 1104f may be or include elements for compression/decompression and echo cancellation and may include other suitable processing elements in other embodiments. Components of the baseband circuitry 1104 may be suitably combined in a single chip or a single chipset, or disposed on a same circuit board in some embodiments. In some embodiments, some or all of the constituent components of the baseband circuitry 1104 and the application circuitry 1102 may be implemented together, such as, for example, on a system on a chip (SOC).

In some embodiments, the baseband circuitry 1104 may provide for communication compatible with one or more radio technologies. For example, in some embodiments, the baseband circuitry 1104 may support communication with an EUTRAN and/or other wireless metropolitan area networks (WMAN), a WLAN, or a WPAN. Embodiments in which the baseband circuitry 1104 is configured to support radio communications of more than one wireless protocol may be referred to as multi-mode baseband circuitry. In some embodiments, the UE 1100 can be configured to operate in accordance with communication standards or other protocols or standards, including IEEE 902.16 wireless technology (WiMax®), IEEE 902.11 wireless technology (Wi-Fi®) including IEEE 902.11ad, which operates in the 100 GHz millimeter wave spectrum, or various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

The RF circuitry 1106 may enable communication with wireless networks using modulated electromagnetic radiation through a non-solid medium. In various embodiments, the RF circuitry 1106 may include switches, filters, amplifiers, etc., to facilitate the communication with the wireless network. The RF circuitry 1106 may include a receive signal path which may include circuitry to down-convert RF signals received from the FEM circuitry 1108 and provide baseband signals to the baseband circuitry 1104. The RF circuitry 1106 may also include a transmit signal path which may include circuitry to up-convert baseband signals provided by the baseband circuitry 1104 and provide RF output signals to the FEM circuitry 1108 for transmission.

In some embodiments, the RF circuitry 1106 may include a receive signal path and a transmit signal path. The receive signal path of the RF circuitry 1106 may include mixer circuitry 1106a, amplifier circuitry 1106b, and filter circuitry 1106c. The transmit signal path of the RF circuitry 1106 may include the filter circuitry 1106c and the mixer circuitry 1106a. The RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by the synthesizer circuitry 1106d. The amplifier circuitry 1106b may be configured to amplify the down-converted signals, and the filter circuitry 1106c may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, the mixer circuitry 1106a of the receive signal path may comprise passive mixers, although the scope of the embodiments is not limited in this respect.

In some embodiments, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1104 and may be filtered by the filter circuitry 1106*c*. The filter circuitry 1106*c* may include a low-pass filter (LPF), although the scope of the embodiments is not limited in this respect.

In some embodiments, the mixer circuitry 1106*a* of the receive signal path and the mixer circuitry 1106*a* of the transmit signal path may include two or more mixers and may be arranged for quadrature downconversion and/or upconversion respectively. In some embodiments, the mixer circuitry 1106*a* of the receive signal path and the mixer circuitry 1106*a* of the transmit signal path may include two or more mixers and may be arranged for image rejection (e.g., Hartley image rejection). In some embodiments, the mixer circuitry 1106*a* of the receive signal path and the mixer circuitry 1106*a* of the transmit signal path may be arranged for direct downconversion and/or direct upconversion, respectively. In some embodiments, the mixer circuitry 1106*a* of the receive signal path and the mixer circuitry 1106*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio integrated circuit (IC) circuitry may be provided for processing signals for each spectrum, although the scope of the embodiments is not limited in this respect.

In some embodiments, the synthesizer circuitry 1106*d* may be a fractional-N synthesizer or a fractional N/N+1 synthesizer, although the scope of the embodiments is not limited in this respect, as other types of frequency synthesizers may be suitable. For example, the synthesizer circuitry 1106*d* may be a delta-sigma synthesizer, a frequency multiplier, or a synthesizer comprising a phase-locked loop with a frequency divider.

The synthesizer circuitry 1106*d* may be configured to synthesize an output frequency for use by the mixer circuitry 1106*a* of the RF circuitry 1106 based on a frequency input and a divider control input. In some embodiments, the synthesizer circuitry 1106*d* may be a fractional N/N+1 synthesizer.

In some embodiments, frequency input may be provided by a voltage controlled oscillator (VCO), although that is not a requirement. Divider control input may be provided by either the baseband circuitry 1104 or the application circuitry 1102 depending on the desired output frequency. In some embodiments, a divider control input (e.g., N) may be determined from a look-up table based on a channel indicated by the application circuitry 1102.

The synthesizer circuitry 1106*d* of the RF circuitry 1106 may include a divider, a delay-locked loop (DLL), a multiplexer, and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable delay elements, a phase detector, a charge pump, and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1106*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 1106 may include an IQ/polar converter.

The FEM circuitry 1108 may include a receive signal path, which may include circuitry configured to operate on RF signals received from the one or more antennas 1110, amplify the received signals, and provide the amplified versions of the received signals to the RF circuitry 1106 for further processing. The FEM circuitry 1108 may also include a transmit signal path, which may include circuitry configured to amplify signals for transmission provided by the RF circuitry 1106 for transmission by one or more of the one or more antennas 1110.

In some embodiments, the FEM circuitry 1108 may include a Tx/Rx switch to switch between transmit mode and receive mode operation. The FEM circuitry 1108 may include a receive signal path and a transmit signal path. The receive signal path of the FEM circuitry 1108 may include a low-noise amplifier (LNA) to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by the RF circuitry 1106), and one or more filters to generate RF signals for subsequent transmission (e.g., by one or more of the one or more antennas 1110).

In some embodiments, the UE 1100 may include additional elements such as, for example, a memory/storage, display, camera, sensor, and/or input/output (I/O) interface as described in more detail below. In some embodiments, the UE 1100 described herein may be part of a portable wireless communication device, such as a PDA, a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device that may receive and/or transmit information wirelessly. In some embodiments, the UE 1100 may include one or more user interfaces designed to enable user interaction with the system and/or peripheral component interfaces designed to enable peripheral component interaction with the system. For example, the UE 1100 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or light-emitting diode (LED) screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 1110 may comprise one or more directional or omnidirectional antennas, including, for example, dipole antennas, monopole antennas, patch antennas, loop antennas, microstrip antennas, or other types of antennas suitable for transmission of RF signals. In some multiple-input multiple-output (MIMO) embodiments, the antennas 1110 may be effectively separated to benefit from spatial diversity and the different channel characteristics that may result.

Although the UE 1100 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, field-programmable gate arrays (FPGAs), application-specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Figure 12:
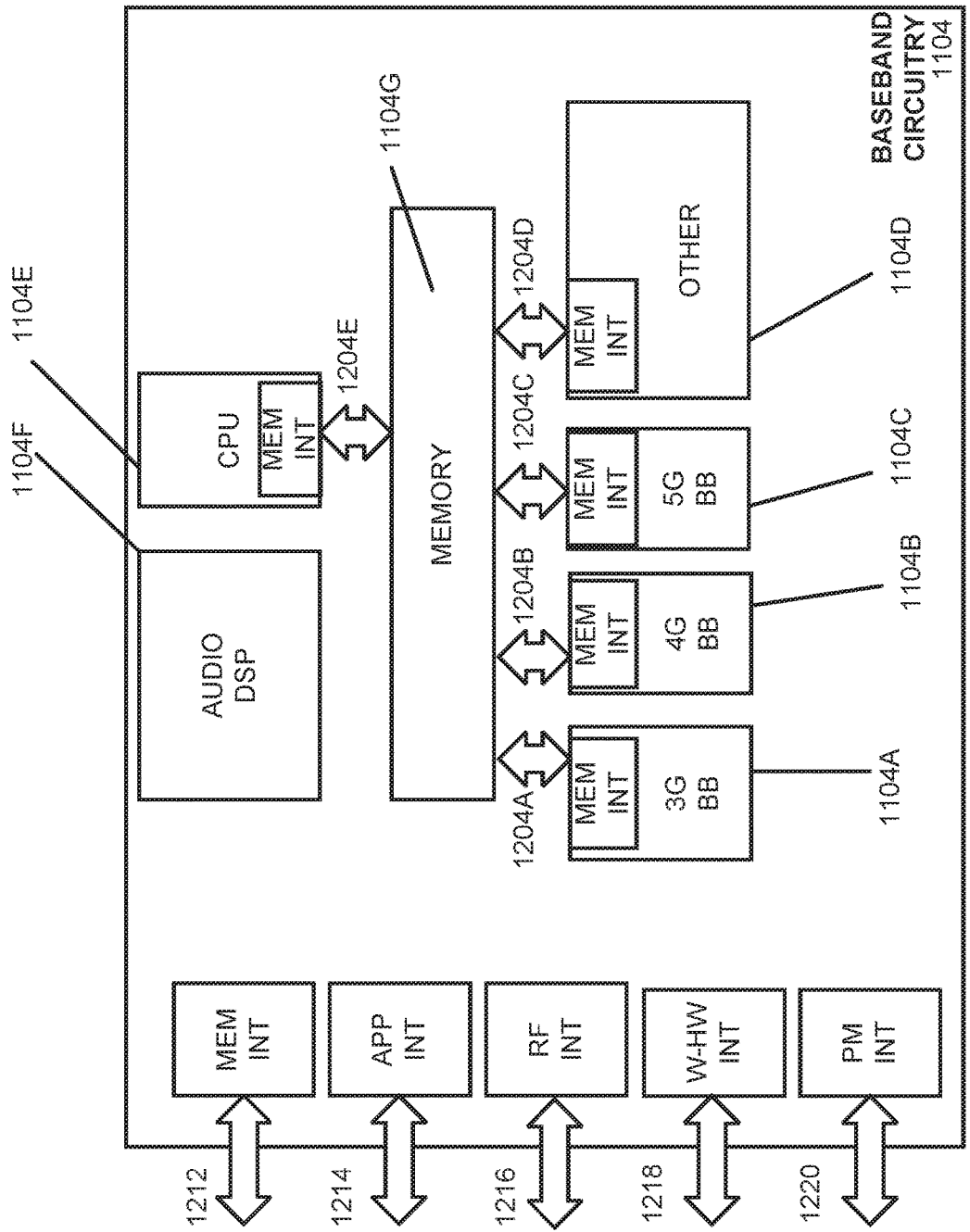
FIG. 12 illustrates example interfaces of baseband circuitry in accordance with some embodiments.

FIG. 12 illustrates example interfaces of baseband circuitry in accordance with some embodiments. As discussed above, the baseband circuitry 1104 of FIG. 11 may comprise processors 1104A-1104E and a memory 1104G utilized by said processors. Each of the processors 1104A-1104E may include a memory interface, 1204A-1204E, respectively, to send/receive data to/from the memory 1104G.

The baseband circuitry 1104 may further include one or more interfaces to communicatively couple to other circuitries/devices, such as a memory interface 1212 (e.g., an interface to send/receive data to/from memory external to the baseband circuitry 1104), an application circuitry interface 1214 (e.g., an interface to send/receive data to/from the application circuitry 1102 of FIG. 11), an RF circuitry interface 1216 (e.g., an interface to send/receive data to/from RF circuitry 1106 of FIG. 11), a wireless hardware connectivity interface 1218 (e.g., an interface to send/receive data to/from Near Field Communication (NFC) components, Bluetooth® components (e.g., Bluetooth® Low Energy), Wi-Fi® components, and other communication components), and a power management interface 1220 (e.g., an interface to send/receive power or control signals to/from the PMC 1112.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

While the communication device-readable medium is illustrated as a single medium, the term "communication device-readable medium" may include a single medium or multiple media (e.g., a centralized or distributed database, and/or associated caches and servers) configured to store the one or more instructions.

The term "communication device-readable medium" may include any medium that is capable of storing, encoding, or carrying instructions for execution by the communication device and that cause the communication device to perform any one or more of the techniques of the present disclosure, or that is capable of storing, encoding, or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., EPROM, Electrically Erasable Programmable Read-Only Memory (EEPROM)) and flash memory devices; magnetic disks, such as internal hard disks and removable disks; magneto-optical disks: RAM; and CD-ROM and DVD-ROM disks. In some examples, communication device-readable media may include non-transitory communication device-readable media. In some examples, communication device-readable media may include communication device-readable media that is not a transitory propagating signal.

The instructions may further be transmitted or received over a communications network using a transmission medium via a network interface device utilizing any one of a number of transfer protocols (e.g., frame relay, internet protocol (IP), transmission control protocol (TCP), user datagram protocol (UDP), HTTP, etc.). Example communication networks may include a LAN, a WAN, a packet data network (e.g., the Internet), mobile telephone networks (e.g., cellular networks), Plain Old Telephone Service (POTS) networks, wireless data networks (e.g., IEEE 902.11 family of standards known as Wi-Fi®, IEEE 902.16 family of standards known as WiMAX®), IEEE 902.15.4 family of standards, an LTE family of standards, a Universal Mobile Telecommunications System (UMTS) family of standards, or peer-to-peer (P2P) networks, among others. In an example, the network interface device may include one or more physical jacks (e.g., Ethernet, coaxial, or phone jacks) or one or more antennas to connect to the communications network. In an example, the network interface device may include a plurality of antennas to wirelessly communicate using single-input multiple-output (SIMO), MIMO, or multiple-input single-output (MISO) techniques. In some examples, the network interface device may wirelessly communicate using Multiple User MIMO techniques. The term "transmission medium" shall be taken to include any intangible medium that is capable of storing, encoding, or carrying instructions for execution by the communication device, and includes digital or analog communications signals or other intangible media to facilitate communication of such software.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), RAM, magnetic disk storage media, optical storage media, flash-memory devices, and other storage devices and media. Some embodiments may include one or more processors and may be configured with instructions stored on a computer-readable storage device.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the subject matter may be referred to herein, individually and/or collectively, by the term "embodiments" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended; that is, a system, UE, article, composition, formulation, or process that includes elements in addition to those listed after such a term in a claim is still deemed to fall within the scope of that claim. Moreover, in the following claims, the terms "first," "second," "third," etc, are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A user equipment (UE), comprising:
   at least one antenna;
   a radio operably coupled to the at least one antenna for communicating with a cellular network; and
   a processor operably coupled to the radio;
   wherein the UE is configured to:
   receive a bandwidth indication from a base station;
   process the bandwidth indication from the base station; and
   identify, based on the bandwidth indication a first codec rate less than or equal to a rate identified by the bandwidth indication, and
   send or receive data using data encoded with a first codec from a plurality of codecs supported by the UE, the first codec having the first codec rate, following receipt of the bandwidth indication.

2. The UE of claim 1, wherein the UE is further configured to:
   encode initial voice data using a second codec associated with a second codec rate for uplink (UL) communication to the base station,
   wherein the bandwidth indication comprises a reduced bandwidth allocation, and
   wherein the second codec rate is less than the first codec rate.

3. The UE of claim 1, wherein the bandwidth indication comprises an Internet Protocol multimedia subsystem (IMS) voice Data Radio Bearer (DRB) UL bandwidth (BW) indication.

4. The UE of claim 3, further comprising:
   a memory coupled to the processor, the memory comprising a table of the plurality of codecs supported by the UE, an associated sampling rate for each codec, and an associated codec rate for each codec of the plurality of codecs,
   wherein the processor identifies the first codec from the table of the memory.

5. The UE of claim 3, wherein the bandwidth indication is determined based on a radio condition and a number of served UEs.

6. The UE of claim 3, wherein the bandwidth indication is received via Radio Resource Control (RRC) signaling from the base station.

7. The UE of claim 3, wherein the UE is further configured to:
   process the bandwidth indication to determine a downlink bandwidth indication;
   identify the first codec based on the downlink bandwidth indication; and initiate transmission of a preferred codec bitrate indication to the base station,
wherein the preferred codec bitrate is based on an observed output quality level, a packet loss rate, or a jitter level.

8. The UE of claim 7, wherein the preferred codec bitrate is negotiated with a peer UE by the UE using a codec negotiation procedure with a minimum and a maximum bitrate.

9. The UE of claim 7, wherein the UE is further configured to communicate the preferred codec bitrate to a remote peer or a media gateway via the base station using Real-time Transport Protocol (RTP) Codec Mode Request (CMR).

10. The UE of claim 7, wherein the UE is further configured to communicate the preferred codec bitrate to a remote peer or a media gateway via the base station using a session initiated protocol (SIP) re-invite to negotiate the preferred codec and an associated bitrate when RTP CMR is not possible.

11. The UE of claim 1, wherein the bandwidth indication is received via inband signaling using a media access control (MAC) control element.

12. The UE of claim 1, wherein the bandwidth indication comprises a UL bandwidth and a downlink (DL) bandwidth different than the UL bandwidth.

13. The UE of claim 1, wherein the UE further identifies the first codec by determining a computation of bandwidth based on the first codec rate and a set of additional data,
wherein the additional data comprises a protocol layer header.

14. The UE of claim 1 wherein the bandwidth indication is a recommended bitrate.

15. A non-transitory-computer-readable medium comprising instructions that, when executed by a processor of an apparatus of a user equipment (UE), causes the apparatus to:
decode a bandwidth indication from a base station;
process the bandwidth indication from the base station; and
identify a first codec having a first codec rate less than or equal to the bandwidth indication from a plurality of codecs supported by the UE, and
communicate with the base station using data encoded with the first codec following receipt of the bandwidth indication.

16. A base station comprising:
a plurality of antennas;
a radio operably coupled to the plurality of antennas; and
a processor operably coupled to the radio;
wherein the base station is configured to:
transmit a bandwidth indication to a user equipment (UE); and
send or receive data to the UE over a wireless communication channel, wherein the data is encoded, following transmission of the bandwidth indication, with a first codec of a plurality of codecs supported by the UE, and wherein the data encoded by the first codec has a first codec rate less than or equal to a rate identified by the bandwidth indication.

17. The base station of claim 16 wherein the base station is further configured to:
decode initial voice data using a second codec associated with a second codec rate for uplink (UL) communication from the UE,
wherein the bandwidth indication comprises a reduced bandwidth allocation, and
wherein the second codec rate is less than the first codec rate.

18. The base station of claim 17, wherein the base station is further configured to receive and send the transmission of the preferred codec bitrate to a remote UE peer or a media gateway using a session initiated protocol (SIP) re-invite to negotiate the preferred codec and an associated bitrate when RTP CMR is not possible.

19. The base station of claim 16, wherein the bandwidth indication comprises an Internet Protocol multimedia subsystem (IMS) voice Data Radio Bearer (DRB) UL bandwidth (BW) indication.

20. The base station of claim 19, wherein the base station determines the bandwidth indication based on a radio condition and a number of served UEs.

21. The base station of claim 19, wherein the bandwidth indication is sent to the UE via Radio Resource Control (RRC) signaling.

22. The base station of claim 16, wherein the bandwidth indication is sent via inband signaling using a media access control (MAC) control element.

23. The base station of claim 16, wherein the bandwidth indication comprises a UL bandwidth and a downlink (DL) bandwidth different than the UL bandwidth.

24. The base station of claim 16 wherein the bandwidth indication is a recommended bitrate.

25. The base station of claim 16, wherein base station is further configured to:
receive transmission of a preferred codec bitrate from the UE; and
send the transmission of the preferred codec bitrate to a remote UE peer or a media gateway,
wherein the transmission is received and sent using Real-time Transport Protocol (RTP) Codec Mode Request (CMR).

* * * * *